U S011943125B2

United States Patent
Kumar et al.

(10) Patent No.: US 11,943,125 B2
(45) Date of Patent: Mar. 26, 2024

(54) DISCONTINUITY DETECTION IN TRANSPORT STREAMS

(71) Applicant: DISH Network Technologies India Private Limited, Karnataka (IN)

(72) Inventors: Amit Kumar, Bangalore (IN); Ankit Gandhi, Bangalore (IN); Himanshu Jain, Bangalore (IN)

(73) Assignee: DISH NETWORK TECHNOLOGIES INDIA PRIVATE LIMITED, Karnataka (IN)

( * ) Notice: Subject to any disclaimer, the term of this patent is extended or adjusted under 35 U.S.C. 154(b) by 289 days.

(21) Appl. No.: 17/585,300

(22) Filed: Jan. 26, 2022

(65) Prior Publication Data
US 2023/0239229 A1    Jul. 27, 2023

(51) Int. Cl.
*H04L 43/0829*    (2022.01)
*H04L 43/0823*    (2022.01)
*H04L 43/106*    (2022.01)
*H04N 21/24*    (2011.01)

(52) U.S. Cl.
CPC ...... *H04L 43/0829* (2013.01); *H04L 43/0847* (2013.01); *H04L 43/106* (2013.01); *H04N 21/2402* (2013.01)

(58) Field of Classification Search
CPC ............ H04N 21/2402; H04L 43/0829; H04L 43/0847; H04L 43/106
See application file for complete search history.

(56) References Cited

U.S. PATENT DOCUMENTS

| 6,169,843 | B1 * | 1/2001 | Lenihan | ............... | H04N 9/8042 |
| | | | | | 348/E5.005 |
| 6,680,955 | B1 * | 1/2004 | Le | ........................... | H04L 65/80 |
| | | | | | 370/477 |
| 6,895,019 | B2 * | 5/2005 | Gibson | .................. | H04L 65/70 |
| | | | | | 714/48 |

(Continued)

FOREIGN PATENT DOCUMENTS

CA    2888683 A1 *    5/2014    ........... H04L 1/0041

OTHER PUBLICATIONS

International Search Report and Written Opinion for PCT/IN2023/050079, dated Mar. 16, 2023, 11 pages.

*Primary Examiner* — James R Sheleheda
(74) *Attorney, Agent, or Firm* — Seed IP Law Group LLP

(57) ABSTRACT

Methods and apparatuses for detecting timestamp discontinuities and video resolution discontinuities within a packet stream and marking locations of the detected discontinuities within the packet stream are described. Prior to transmission of the packet stream, an electronic device may perform timestamp discontinuity detection by acquiring a sequence of packets to be transmitted, identifying a first timestamp associated with an earliest packet within the sequence of packets, identifying a second timestamp associated with a latest packet within the sequence of packets, determining a timestamp time difference between the first timestamp and the second timestamp, determining a maximum chunk time difference based on a data rate at which the sequence of packets were encoded and a data size of the encoded packets, and detecting that a timestamp discontinuity exists within the sequence of packets if the timestamp time difference is greater than the maximum chunk time difference.

20 Claims, 13 Drawing Sheets

(56) References Cited

U.S. PATENT DOCUMENTS

| Patent/Pub. No. | Date | Name | Classification |
|---|---|---|---|
| 7,738,498 B1* | 6/2010 | Yu | H04N 21/4305 375/376 |
| 8,451,170 B2* | 5/2013 | Foerster | G01S 19/24 342/357.75 |
| 9,185,045 B1* | 11/2015 | Yang | H04L 1/08 |
| 10,499,113 B2* | 12/2019 | Toma | H04N 21/85 |
| 10,798,145 B1* | 10/2020 | Garney | H04N 21/2407 |
| 11,741,998 B1* | 8/2023 | Ganesan | H04N 21/4302 386/241 |
| 2005/0036512 A1* | 2/2005 | Loukianov | H04N 21/23608 375/E7.278 |
| 2006/0126667 A1* | 6/2006 | Smith | H04N 21/26616 348/E7.071 |
| 2007/0271388 A1* | 11/2007 | Bowra | H04L 65/762 709/231 |
| 2008/0069002 A1* | 3/2008 | Savoor | H04L 65/65 370/351 |
| 2010/0238792 A1* | 9/2010 | Togo | H04N 21/84 370/216 |
| 2011/0050491 A1* | 3/2011 | Foerster | G01S 19/24 342/357.25 |
| 2012/0128061 A1* | 5/2012 | Labrozzi | H04N 21/8456 375/E7.126 |
| 2013/0297868 A1* | 11/2013 | Yin | G06F 12/0866 711/112 |
| 2013/0336412 A1* | 12/2013 | Erofeev | G11B 27/031 375/E7.2 |
| 2014/0269776 A1* | 9/2014 | Bomfim | H04N 21/237 370/503 |
| 2014/0307734 A1* | 10/2014 | Luby | H04L 67/06 370/390 |
| 2015/0163532 A1* | 6/2015 | Shmueli | H04N 21/2747 386/326 |
| 2015/0319212 A1* | 11/2015 | Mani | H04L 47/626 370/352 |
| 2016/0057317 A1* | 2/2016 | Zhao | H04N 21/8358 348/515 |
| 2016/0086379 A1* | 3/2016 | Sadi | G02B 27/0093 345/633 |
| 2017/0064342 A1* | 3/2017 | Botsford | H04N 21/2381 |
| 2018/0041561 A1* | 2/2018 | Davies | H04L 65/762 |
| 2019/0251764 A1* | 8/2019 | Wang | G06F 16/2282 |
| 2022/0407906 A1* | 12/2022 | Sridhar | H04L 43/20 |
| 2023/0247238 A1* | 8/2023 | Ganesan | H04N 21/2347 725/143 |

* cited by examiner

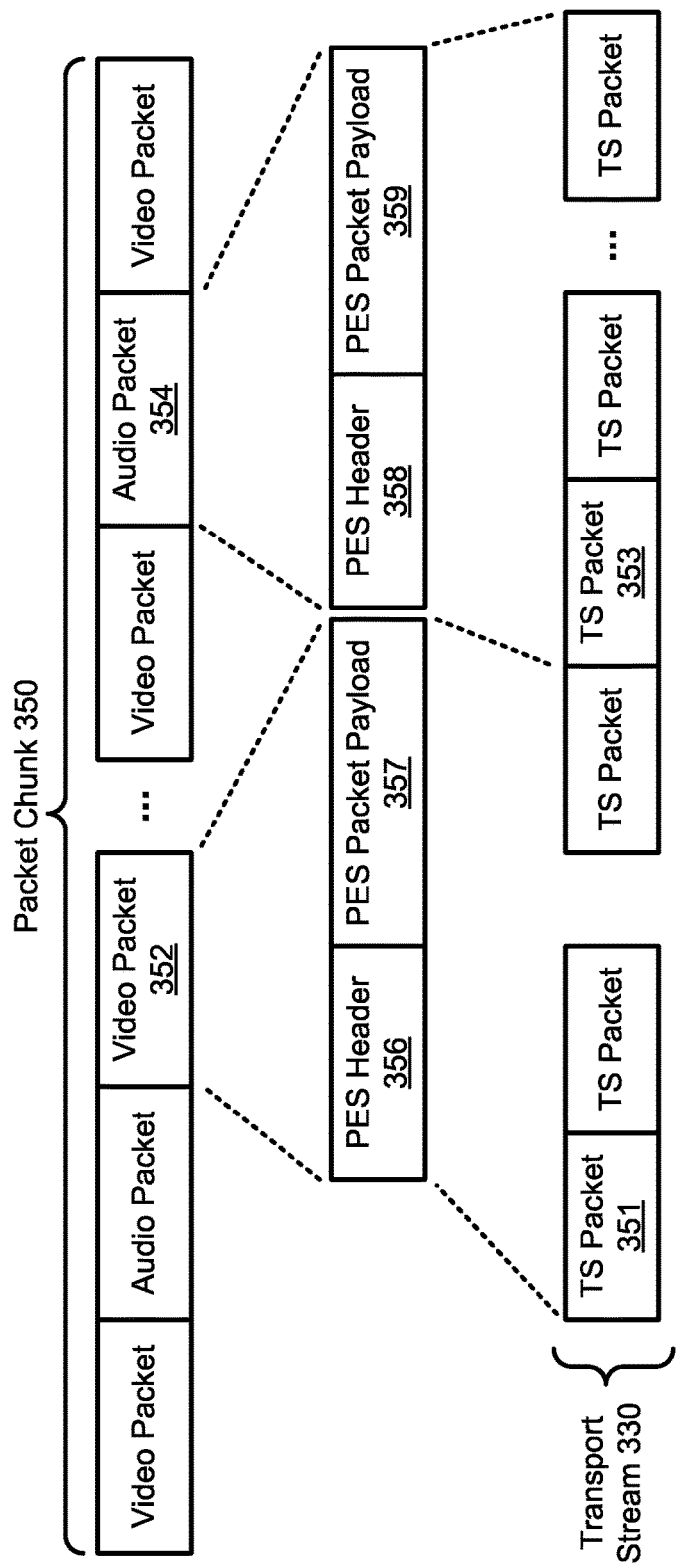
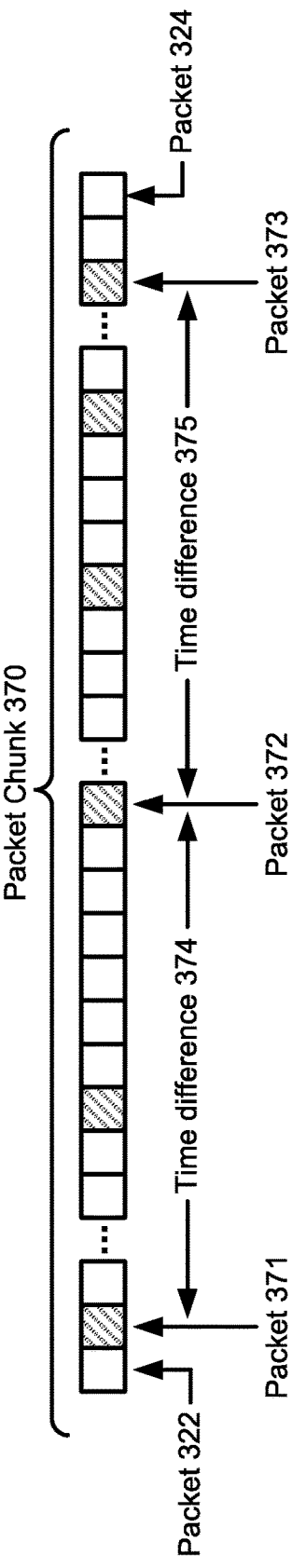
FIG. 3B
FIG. 3C

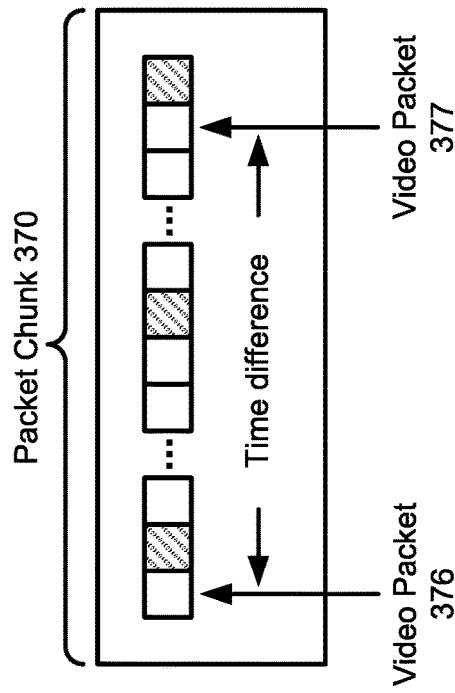
FIG. 3D
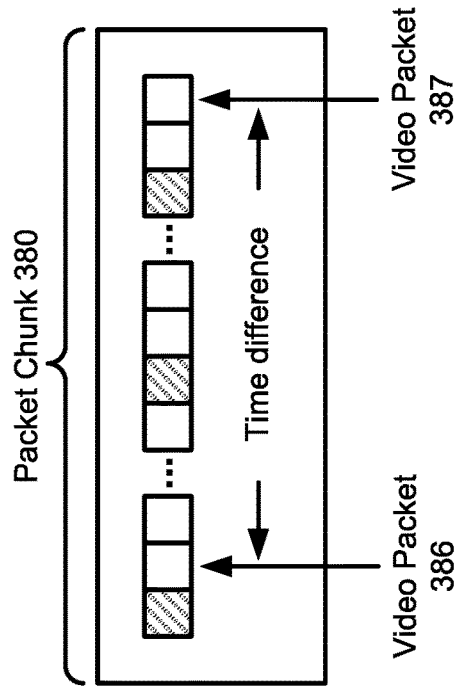
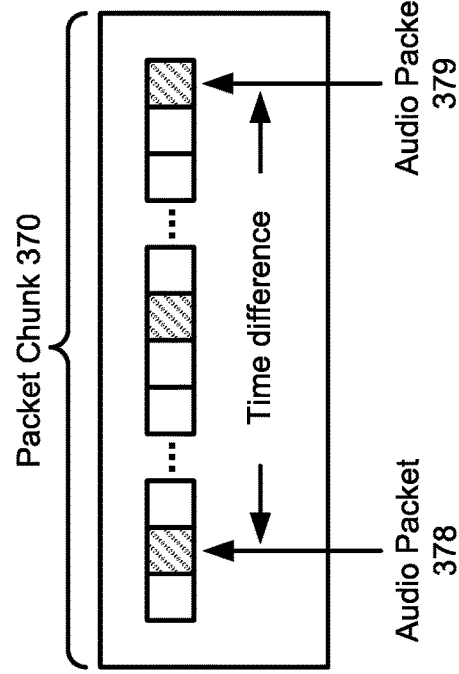
FIG. 3E
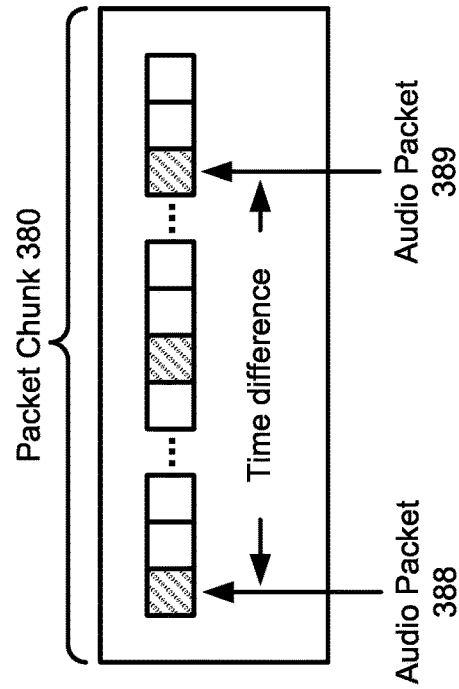

DISCONTINUITY DETECTION IN TRANSPORT STREAMS

BACKGROUND

High-definition television (HDTV) digital broadcasting provides increased picture and audio quality compared with traditional standard-definition television (SDTV) broadcasting. Besides the increased resolution, HDTV also uses a 16:9 aspect ratio (e.g., 1920×1080 pixels) instead of the 4:3 aspect ratio used with SDTV broadcasts. Today, consumers in many metropolitan areas are able to receive numerous over-the-air HDTV channels using an HDTV antenna. The over-the-air (OTA) HDTV antenna may connect to an electronic streaming device that takes the captured local HDTV broadcasts and streams them over a wireless or wired network to client devices (e.g., smartphones and laptop computers) within a home. Besides streaming HDTV content to one or more client devices within the home, the electronic streaming device may also provide digital video recorder (DVR) functionality that enables HDTV content received via the HDTV antenna to be recorded and subsequently streamed to a client device in response to a request from the client device.

BRIEF SUMMARY

Systems and methods for efficiently detecting discontinuities within a packet stream and transmitting location information for the detected discontinuities are provided. The packet stream may include packetized audiovisual content that is transmitted or streamed from a streaming device to one or more client devices. The discontinuities may comprise timestamp discontinuities, video resolution discontinuities, and audio resolution discontinuities occurring within the packetized audiovisual content. A timestamp discontinuity process may include identifying a sequence of packets within the packet stream and sampling a subset of packets of the sequence of packets to identify the earliest and/or latest arriving packets within the sequence of packets that include timestamp information. As not every packet within the sequence of packets may include timestamp information, various sampling methods may be applied to identify the earliest and/or latest arriving packets within the sequence of packets that include timestamp information. According to some embodiments, the technical benefits of the disclosed systems and methods for efficiently detecting discontinuities within a packet stream may include improved processor performance, reduced energy consumption, and the ability to manufacture streaming systems using lower-cost hardware components or reduced data storage.

In some embodiments, prior to or during transmission of a packet stream from a streaming device, the streaming device may perform timestamp discontinuity detection by acquiring a sequence of packets from the packet stream, determining a timestamp time difference between a first timestamp corresponding with an earliest transmitted packet of the sequence of packets that includes timestamp information and a second timestamp corresponding with a latest transmitted packet of the sequence of packets that includes timestamp information, determining or estimating a maximum chunk time difference based on a data rate at which the sequence of packets were encoded and a data size of the sequence of packets, and detecting that a timestamp discontinuity exists within the sequence of packets if the timestamp time difference is greater than the maximum chunk time difference. The ability for the streaming device to efficiently detect timestamp discontinuities within the packet stream allows for improved performance of the streaming device.

BRIEF DESCRIPTION OF THE SEVERAL VIEWS OF THE DRAWINGS

Like-numbered elements may refer to common components in the different figures.

FIG. 3B depicts one embodiment of a packet chunk that comprises a sequence of packets.

FIG. 3C depicts one embodiment of a packet chunk and a process of identifying a location of a timestamp discontinuity within the packet chunk.

FIGS. 3D-3G depict various embodiments of two consecutive packet chunks.

DETAILED DESCRIPTION

Figure 1:
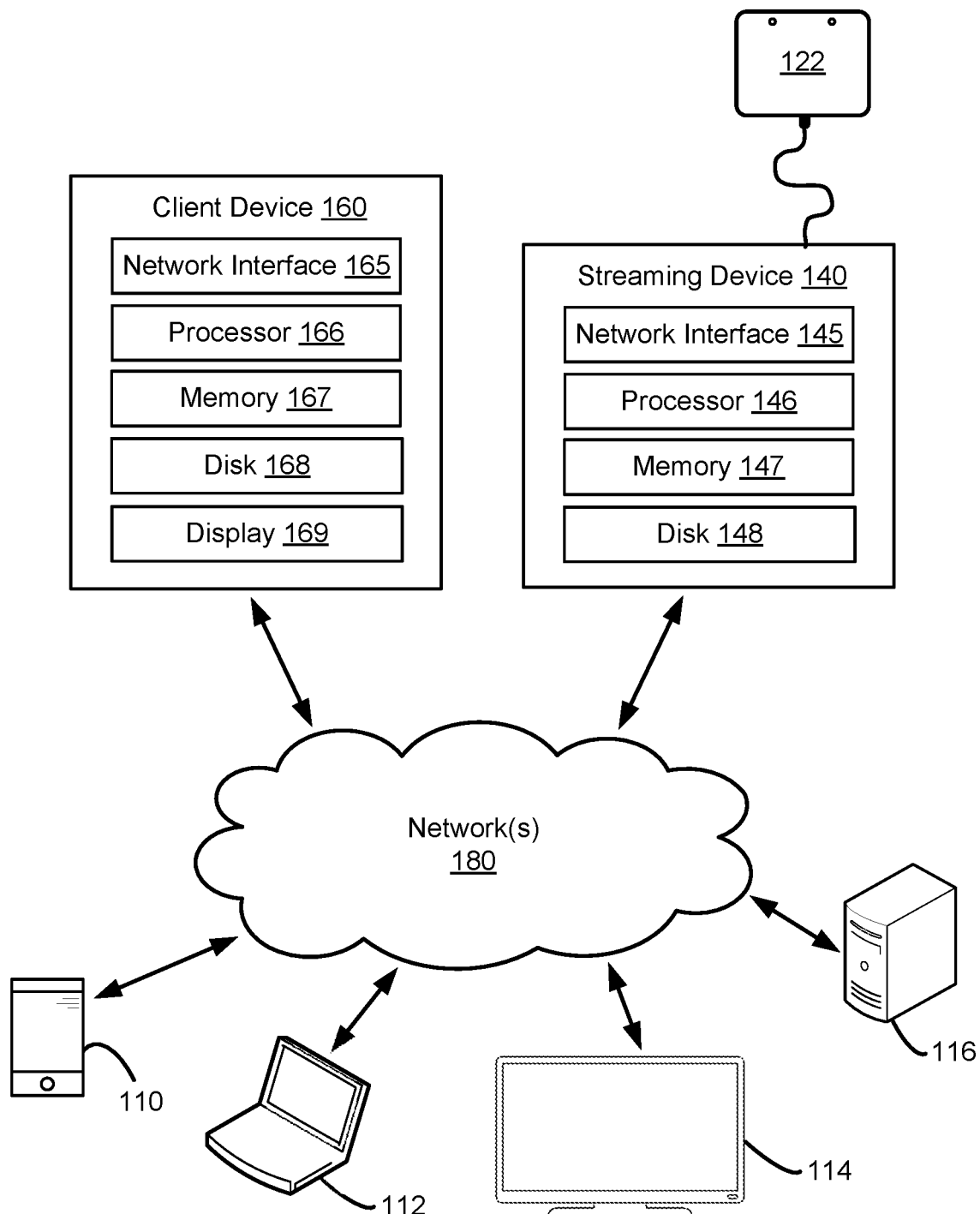
FIG. 1 depicts one embodiment of a networked computing environment.

Technology is described for detecting timestamp discontinuities and video resolution discontinuities within a packet stream and marking locations of the detected discontinuities within the packet stream. In some cases, prior to transmission of a packet stream to one or more client devices, a streaming electronic device may perform timestamp discontinuity detection by acquiring a sequence of packets (e.g., a sequence of audio and video packets) corresponding with a packet chunk, identifying a first timestamp associated with an earliest packet within the sequence of packets, identifying a second timestamp associated with a latest packet within the sequence of packets, determining a timestamp time difference between the first timestamp and the second timestamp, identifying a data rate at which the sequence of packets were encoded, determining a maximum chunk time difference based on the data rate at which the sequence of packets were encoded and a data size of the packet chunk, and detecting that a timestamp discontinuity exists within the packet chunk if the timestamp time difference is greater than the maximum chunk time difference. In response to detecting the timestamp discontinuity, the streaming electronic device may identify a location of the timestamp discontinuity within the packet chunk and notify the one or more client devices of the location of the timestamp discontinuity within the packet chunk prior to the one or more client devices receiving the entire packet chunk. In one example, the streaming electronic device may partition the sequence of packets into a first set of packets and a second set of packets based on the location of the timestamp discontinuity and transmit a timestamp discontinuity marker identifying the location of the timestamp discontinuity and/or a special discontinuity packet identifying the location of the timestamp discontinuity between the first set of packets and the second set of packets.

A timestamp discontinuity may comprise a discontinuity or gap in time between two consecutive timestamps corresponding with two consecutive video packets. The discontinuity or gap in time may comprise an amount of time greater than the video play time or the length of video between the two consecutive timestamps. For example, if the difference in time between two consecutive timestamps corresponding with two consecutive video packets comprises ten seconds and the length of video between the two consecutive timestamps is only three seconds, then the gap in time between the two consecutive timestamps is seven seconds. The two consecutive video packets may comprise video packetized elementary stream (PES) packets within a packet stream or two adjacent video frames in a sequence of video frames.

In one embodiment, a packet stream transmitted to a client device may include a first set of video PES packets (or a first set of video frames) corresponding with a video stream between one and 10 seconds and then a second set of video PES packets (or a second set of video frames) corresponding with the video stream between 15 seconds and 45 seconds; in this case, the video stream has a timestamp discontinuity or gap in time between 10 seconds and 15 seconds. Timestamp discontinuities within the packet stream may occur over time due to signal noise or a high bit error rate causing a transcoding pipeline that is transcoding packets to drop or leave out video packets from the packet stream. Timestamp discontinuities within the packet stream may also occur over time due to network issues that prevent one or more video packets of the packet stream from being pushed over a network to a client device. In some cases, a streaming device streaming video to a client device may have a limited or small-sized memory buffer for storing only a small set of packets and the memory buffer may need to be flushed before each packet of the small set of packets has been successfully transferred to the client device.

A resolution discontinuity may comprise a change in video resolution between two adjacent video packets (e.g., between two packetized elementary stream packets) within a packet stream or between two adjacent video frames in a sequence of video frames. In some cases, as available network bandwidth changes over time, a transcoding pipeline may change the bit rates and/or video resolution used for encoding video packets. For example, if the available network bandwidth is greater than a threshold bandwidth (e.g., is greater than 20 Mbps), then a video packet with a resolution of 1920×1080 (1080p) may be generated; however, if the available network bandwidth is less than or equal to the threshold bandwidth, then a video packet with a resolution of 1280×720 (720p) may be generated.

One technical issue is that if a client device receives a packet stream with a timestamp discontinuity, then the client device may fail to properly decode and display video frames from the packet stream. However, if the client device is notified ahead of time of receiving packets with a timestamp discontinuity or is notified (e.g., using a special packet marking the point of the timestamp discontinuity) when the timestamp discontinuity exists within the packet stream, then the client device may be able to take measures to prevent a failure to properly decode and display video frames from the packet stream. In one embodiment, in order to notify the client device that a timestamp discontinuity exists within the packet stream, a special discontinuity packet or a null packet may be inserted into the packet stream between the two consecutive packets in which the timestamp discontinuity exists. The special discontinuity packet may be inserted at the point of the timestamp discontinuity within the packet stream and may indicate a length of the time gap corresponding with the timestamp discontinuity. The client device may receive the special discontinuity packet within the packet stream and detect the timestamp discontinuity based on the contents of the special discontinuity packet. In some cases, the client device may detect the existence of a timestamp discontinuity based on the presence of a discontinuity marker within a received packet that may comprise the last packet before the timestamp discontinuity.

In order to detect a timestamp discontinuity, a sequence of video frame packets comprising a packet chunk of a chunk size (e.g., 96 KB) may be acquired and every video frame packet within the packet chunk may be parsed to detect whether a timestamp discontinuity exists within the packet chunk. One technical issue with fully parsing every video frame packet within the packet chunk or identifying timestamp information for every video frame packet within the packet chunk is that processor utilization may be excessive and audiovisual (AV) throughput may be reduced. One technical benefit of identifying two different timestamps at the ends of the packet chunk and detecting that a timestamp discontinuity exists within the packet chunk based on a difference between the two different timestamps is that processor utilization may be reduced and audiovisual (AV) throughput may be increased. Furthermore, a technical benefit of identifying a first timestamp corresponding with a first video frame packet closest to the earliest arriving packet within the packet chunk, identifying a second timestamp corresponding with a second video frame packet closest to the latest arriving packet within the packet chunk, determining a timestamp time difference between the first timestamp and the second timestamp, calculating a maximum chunk time difference by dividing the chunk size by a data rate at which each packet of the packet chunk was encoded, and detecting that a timestamp discontinuity exists within the packet chunk in response to detecting that the timestamp time difference is greater than the maximum chunk time difference is that processor utilization may be reduced, memory usage may be reduced, and/or video frame packet throughput may be increased. In one example, the maximum chunk time difference may be calculated by dividing the chunk size by a bit rate (or data rate) at which each packet of the packet chunk was encoded. The bit rate may refer to the amount of data transmitted in a given amount of time (e.g., kilobytes per second).

An elementary stream (ES) may contain only one type of data (e.g., only video data). A video elementary stream may be generated using a video encoder. An audio elementary stream may be generated using an audio encoder. The video elementary stream may comprise a sequence of video frames. In one example, the video frames may comprise I-Frames (or intra-coded frames that are coded without reference to any other frames), P-Frames (or predictive-coded frames that are coded using motion compensated prediction from a previous reference frame), and B-Frames (or bi-directionally predictive-coded frames that are coded using motion compensated prediction from previous reference frames and/or future reference frames). A video packetized elementary stream (PES) may correspond with a video ES that has been packetized. Video PES packets may have a variable length. Each video PES packet may correspond with one coded video frame and include a header with timestamp information for the coded video frame.

FIG. 1 depicts one embodiment of a networked computing environment 100 in which the disclosed technology may be practiced. Networked computing environment 100 includes a plurality of computing devices interconnected through one or more networks 180. The plurality of computing devices may include mobile computing devices (e.g., a smartphone) and non-mobile computing devices (e.g., a desktop computer). The one or more networks 180 allow a particular computing device to connect to and communicate with another computing device. The depicted computing devices include mobile smartphone 110, laptop computing device 112, network-connected digital television 114, hardware server 116, streaming device 140, and client device 160. In some embodiments, the plurality of computing devices may include other computing devices not shown. In some embodiments, the plurality of computing devices may include more than or less than the number of computing devices depicted in FIG. 1. The one or more networks 180 may include a cellular network, a mobile network, a wireless network, a wired network, a secure network such as an enterprise private network, an unsecure network such as a wireless open network, a local area network (LAN), a wide area network (WAN), the Internet, or a combination of networks. Each network of the one or more networks 180 may include hubs, bridges, routers, switches, and wired transmission media such as a wired network or direct-wired connection.

In some embodiments, computing devices within the networked computing environment 100 may comprise real hardware computing devices or virtual computing devices, such as one or more virtual machines. Networked storage devices within the networked computing environment 100 may comprise real hardware storage devices or virtual storage devices, such as one or more virtual disks. The real hardware storage devices may include non-volatile and volatile storage devices.

Networked computing environment 100 may provide a cloud computing environment for one or more computing devices. Cloud computing may refer to Internet-based computing, wherein shared resources, software, and/or information are provided to the one or more computing devices on-demand via the Internet (or other network). The term "cloud" may be used as a metaphor for the Internet, based on the cloud drawings used in computer networking diagrams to depict the Internet as an abstraction of the underlying infrastructure it represents.

The client device 160 may comprise a portable electronic device, a mobile smartphone, a laptop computer, a tablet computer, a desktop computer, a network-connected digital television, or an electronic device with a display screen. One embodiment of client device 160 includes a network interface 165, processor 166, memory 167, disk 168, and display 169 all in communication with each other. Network interface 165 allows client device 160 to connect to one or more networks 180. Network interface 165 may include a wireless network interface and/or a wired network interface. Processor 166 allows client device 160 to execute computer readable instructions stored in memory 167 in order to perform processes discussed herein. Processor 166 may include one or more processing units, such as one or more CPUs and/or one or more GPUs. Memory 167 may comprise one or more types of memory (e.g., RAM, SRAM, DRAM, ROM, EEPROM, or Flash). Memory 167 may comprise a hardware storage device. Display 169 may comprise a touch-screen display or a light emitting diode (LED) display.

In some cases, the server 116 may comprise a server within a data center. The data center may include one or more servers, such as server 160, in communication with one or more storage devices. The servers and data storage devices within a data center may be in communication with each other via a networking fabric connecting server data storage units within the data center to each other. In general, a "server" may refer to a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

The streaming device 140 may comprise a network-connected electronic device. One embodiment of streaming device 140 includes a network interface 145, processor 146, memory 147, and disk 148 all in communication with each other. Network interface 145 allows streaming device 140 to connect to one or more networks 180. Network interface 145 allows streaming device 140 to connect to one or more client devices, such as client device 160, via the one or more networks 180. Network interface 145 may include a wireless network interface and/or a wired network interface. Processor 146 allows streaming device 140 to execute computer readable instructions stored in memory 147 in order to perform processes discussed herein. Processor 146 may include one or more processing units, such as one or more CPUs and/or one or more GPUs. Memory 147 may comprise one or more types of memory (e.g., RAM, SRAM, DRAM, ROM, EEPROM, or Flash). Memory 147 may comprise a hardware storage device. The processor 146 and memory 147 may be configured to allow the streaming device 140 to encrypt video streams, to reduce the video resolution of video streams, and to perform transcoding operations. The streaming device 140 is connected to an antenna 122 for receiving over-the-air digital television signals. The streaming device 140 may stream video streams received from the antenna 122 to client devices located across a local area network or a wide area network. The antenna 122 may comprise an over-the-air HDTV antenna for receiving HDTV digital broadcasting signals.

HDTV digital broadcasting has several limitations due to the nature of terrestrial systems that broadcast HDTV signals. For example, terrestrial broadcasting systems typically transmit radio frequency (RF) signals from antenna towers that are located in different geographical regions and any obstructing features (e.g., mountains and buildings) between the transmitting antenna (or transmitter) and a receiving antenna (or receiver) may block or weaken the transmitted signals. Moreover, the quality of transmitted signals may be impacted by the presence of electromagnetic interference (EMI) caused by nearby power lines, RF interference caused by nearby radio transmitters, and other sources of RF noise. An HDTV receiver may only be able to reliably decode HDTV content that is received with a signal strength or signal to noise ratio that is sufficient to decode the transmitted HDTV content with an acceptable or correctable number of errors.

In one embodiment, the streaming device 140 may include a wired networking interface (e.g., an Ethernet networking interface), a wireless interface (e.g., a WiFi networking interface), a 1 TB hard drive, a 1 GB SDRAM, one or more OTA tuners, and one or more hardware processors with dedicated video processing and transcoding capability. The streaming device 140 may include a dual channel transcoder for transcoding high-definition television programs (e.g., from MPEG-2 to MPEG-4 or H.264) from two transport streams. An MPEG transport stream (or transport stream) may comprise a digital container format for the transmission and storage of audio and video information. In some cases, the transport stream may carry data for multiple programs and channels and may include packetized elementary streams with error correction and synchronization pattern features for ensuring data transmission integrity. The transport stream may include one or more video packetized elementary streams, one or more audio packetized elementary streams, scheduling information, and closed captioning information.

In some embodiments, the streaming device 140 may detect that a client device, such as client device 160, has requested to receive a live video stream captured by antenna 122, and in response, the streaming device 140 may transmit a reduced resolution version of the live video stream to the client device, determine encryption and decryption keys for passing encrypted messages to the client device while the reduced resolution version of the live video stream is transmitted to the client device, communicate a point in time (or a time period) after which an encrypted version of the live video stream will be transmitted to the client device, and then generate and transmit the encrypted version of the live video stream to the client device subsequent to the point in time (or subsequent to the time period).

A video stream or the electronic files or packets comprising portions of the video stream may be encrypted using symmetric encryption or asymmetric encryption (e.g., public-key cryptography) prior to being transmitted to a client device. In one example, video stream packets may be encrypted using a symmetric key encryption algorithm (e.g., AES or triple DES) or an algorithm that utilizes symmetric and asymmetric keys to encrypt data (e.g., PGP). In another example, transport stream packet payloads may be encrypted prior to transmission using a symmetric cryptographic algorithm (e.g., AES) or an asymmetric cryptographic algorithm (e.g., RSA). A symmetric session key allows the client device and the streaming device to use the same session key to encrypt and decrypt audiovisual content and other data.

Figure 2A:
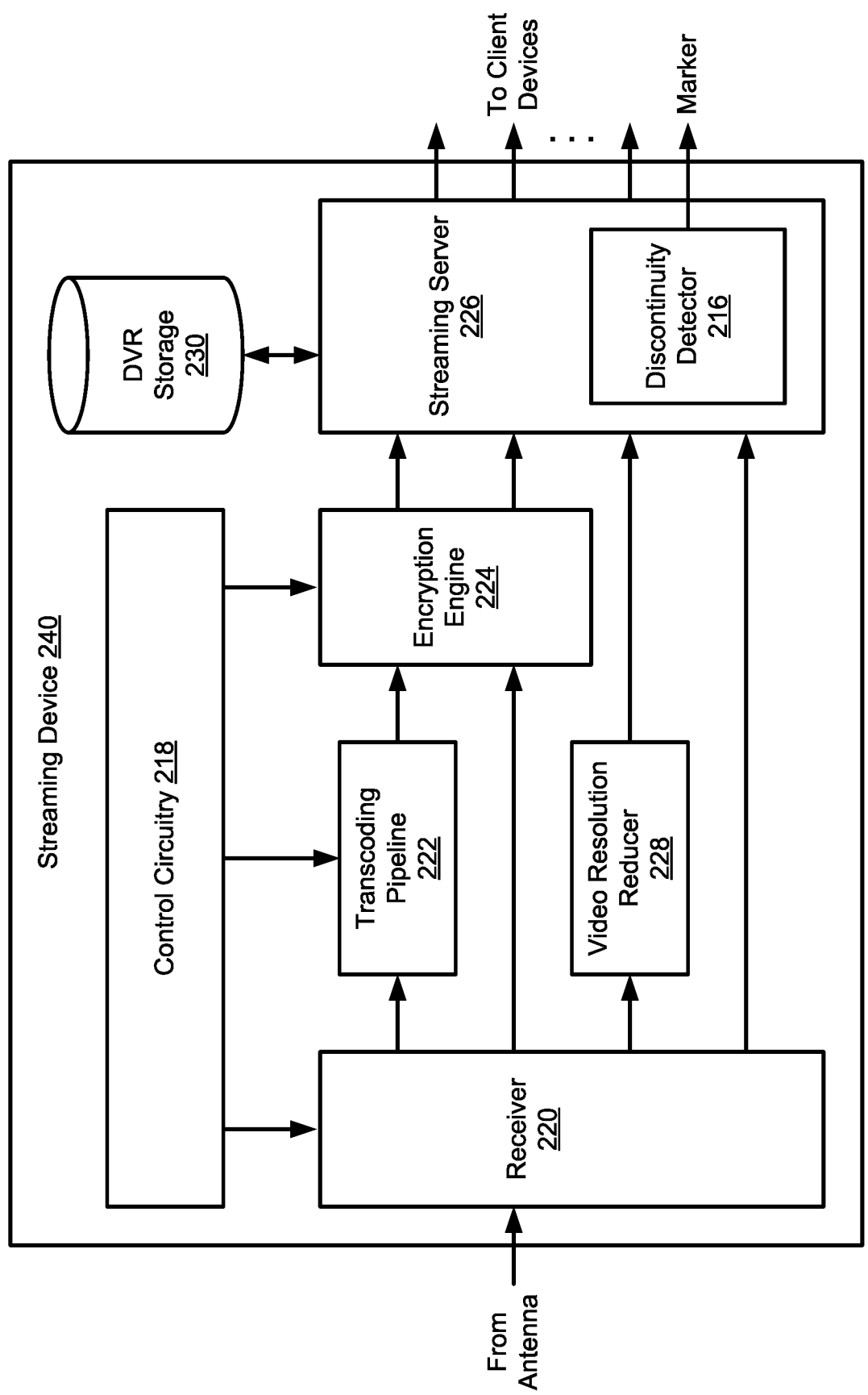
FIG. 2A depicts one embodiment of a streaming device for streaming audiovisual content to one or more client devices.

FIG. 2A depicts one embodiment of a streaming device 240 for streaming audiovisual content to one or more client devices. In one example, the streaming device 240 may correspond with the streaming device 140 in FIG. 1. As depicted, the streaming device 240 includes a receiver 220 for receiving over-the-air digital television signals from an antenna, a transcoding pipeline 222, an encryption engine 224, a video resolution reducer 228, control circuitry 218, a streaming server 226, and a digital video recorder (DVR) storage 230. The receiver 220 may receive a video stream encoded using a first video coding format (e.g., MPEG-2) from an over-the-air HDTV antenna. The video resolution reducer 228 may generate a video stream with a reduced video resolution (e.g., cutting the number of pixels in half). The transcoding pipeline 222 may be used to generate a video stream encoded using a second video coding format (e.g., MPEG-4 or H.264) different from the first video coding format. The control circuitry 218 may be implemented using an application-specific integrated circuit, a microcontroller (e.g., by executing appropriate instructions), a field-programmable gate array, or a reconfigurable circuit. The control circuitry 218 may configure the receiver 220, the transcoding pipeline 222, and/or the encryption engine 224 to perform processes discussed herein. The encryption engine 224 may encrypt packets or packet payloads corresponding with either the video stream encoded using the first video coding format or the video stream encoded using the second video coding format. The streaming server 226 may stream an encrypted version of the video stream encoded using the first video coding format, an encrypted version of the video stream encoded using the second video coding format, an unencrypted version of the video stream encoded using the first video coding format, or a reduced resolution version of the video stream encoded using the first video coding format.

In some cases, the streaming device 240 may convert a video stream from a first video coding format (e.g., from an MPEG-2 or H.262 format) to a second video coding format (e.g., to an MPEG-4 or H.264 format) different from the first video coding format prior to generating an encrypted version of the video stream. The second video coding format may utilize a higher compression rate and/or a lower bit rate compared with the first video coding format. A transcoding process to convert video content from the first video coding format to the second video coding format may decompress the encoded video content into an uncompressed format and then re-compress the uncompressed video content using the second video coding format. The transcoding pipeline 222 may perform the digital-to-digital conversion in which data that is encoded using the first video coding format is encoded using the second video coding format. The streaming device 240 may also reduce the resolution of images within a received video stream (e.g., by reducing the number of pixels per image) and/or adjust the image aspect ratio for the video stream (e.g., adjust the aspect ratio from 4:3 to 16:9) prior to generating an encrypted version of the video stream. The streaming device 240 may also convert a video stream from the first video coding format to a second video coding format and then transmit an unencrypted version of the video stream using the second video coding format prior to generating an encrypted version of the video stream.

The streaming server 226 includes a discontinuity detector 216 for detecting timestamp discontinuities and/or video resolution discontinuities that occur within a transport stream transmitted by the streaming server 226. The discontinuity detector 216 may sample or acquire packets as they are being transmitted to a client device or prior to the packets being transmitted to a client device. In one embodiment, when a timestamp discontinuity or a video resolution discontinuity is detected, the discontinuity detector 216 may output or transmit a point-in-time marker to one or more client devices identifying a location of the timestamp discontinuity or the video resolution discontinuity within the transport stream. In another embodiment, the discontinuity detector 216 may insert a special discontinuity packet or a null packet into the transport stream at the location of the discontinuity (e.g., between two consecutive packets in which a timestamp discontinuity exists).

Figure 2B:
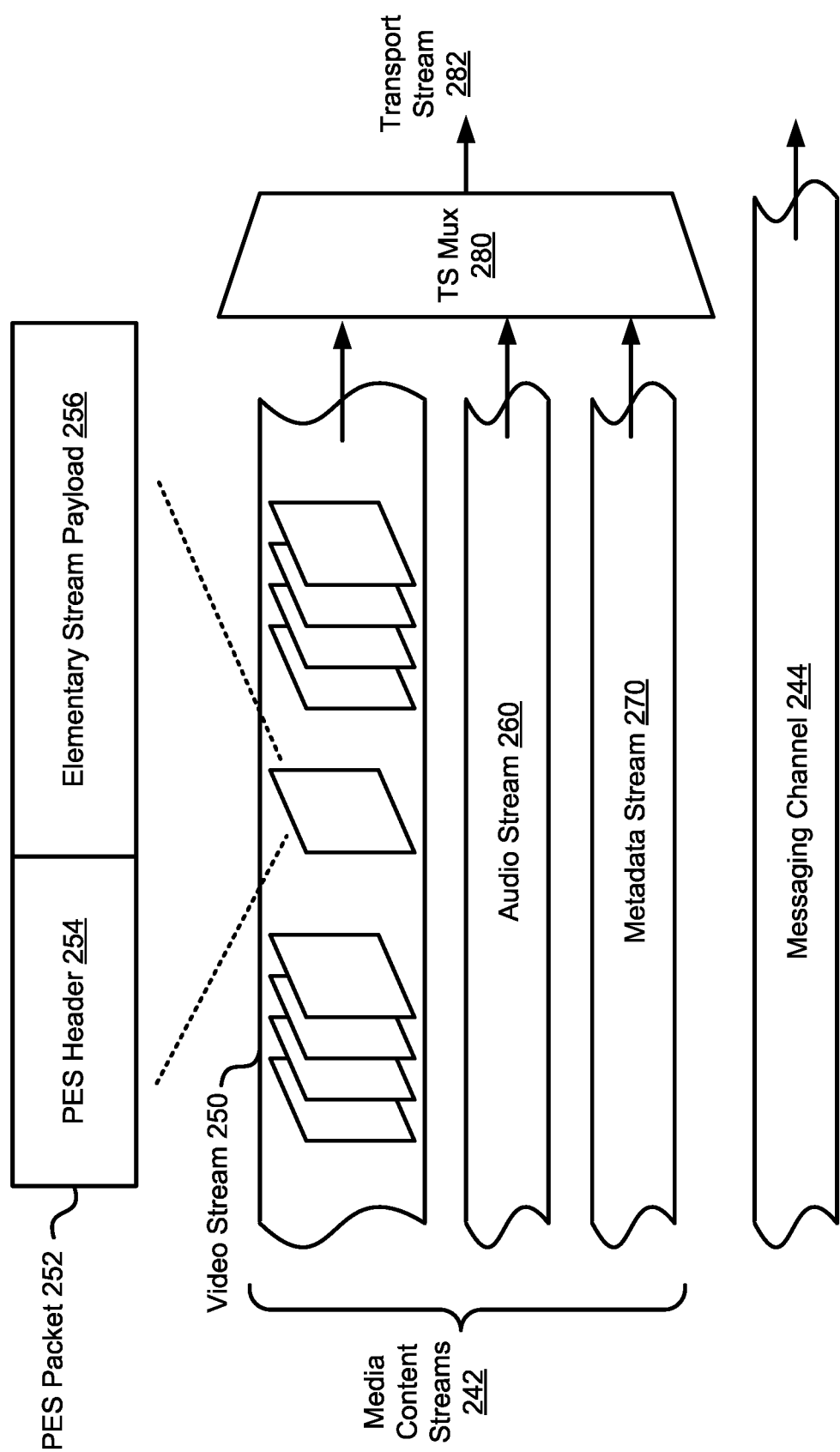
FIG. 2B depicts one embodiment of a digital container format and circuitry for transmitting audiovisual content from a streaming device to one or more client devices.

FIG. 2B depicts one embodiment of a digital container format and circuitry for transmitting audiovisual content from a streaming device to one or more client devices. The digital container format may allow the media content streams 242 to be combined and transported over a single packetized transport stream 282. The transport stream 282 may be received by a client device, such as client device 160 in FIG. 1, and demultiplexed to generate audio and video streams for display on the client device. Circuitry including the transport stream multiplexer (TS MUX) 280 may be included within a streaming server, such as the streaming server 226 of FIG. 2A, to generate the transport stream 282. Transport stream multiplexing may refer to a process in which two or more elementary streams are converted into a single transport stream. The media content streams 242 may include audiovisual content for multiple digital television programs received from an over-the-air HDTV antenna. The substreams of the media content streams 242 may include a video stream 250, a corresponding audio stream 260, and a corresponding metadata stream 270. The metadata stream 270 may include closed captioning and subtitling information. In one example, the media content streams 242 may include a first audio stream for a first language and a second audio stream for a second language that may be synchronized to a common video stream. Elementary streams (e.g., video and audio streams) may be packetized into packetized elementary streams and each packetized elementary stream (PES) may be divided into transport stream packets for transport over the transport stream 282.

The media content streams 242 may comprise multiple packetized elementary streams that are time division multiplexed by the transport stream multiplexer (TS MUX) 280 to generate the transport stream 282. Each packetized elementary stream (PES) may comprise a stream of PES packets and each PES packet 252 may include a PES packet header 254 and a PES packet payload 256. The PES packet 252 may have a variable packet length (e.g., up to a maximum length of 64 KB) while transport stream packets may have a fixed length (e.g., each transport stream packet may be 188 bytes in length). Each PES packet may be partitioned into a number of transport stream packets as a PES packet that represents an access unit (a frame) in an elementary stream is usually larger than the transport stream packet size (e.g., PES packet length is usually larger than 188 bytes). Each transport stream packet may include a packet identifier (PID) to associate the transport stream packet with the PES packet from which it originated. The PES packet header 254 may include packet identifier information that distinguishes between audio and video PES packets. In some embodiments, each video PES packet may correspond with a video frame.

The PES packet header 254 may also include timestamp information for the PES packet payload 256 to allow for the synchronization of a program's audiovisual content. Audio-video synchronization may be performed using timestamp information incorporated into the headers of both video and audio PES packets. The transport stream 282 may contain multiple programs (e.g., associated with different digital television channels) and each program may have its own time base. The timestamp information within the PES packet header 254 may include a Decoding Timestamp (DTS), a Presentation Timestamp (PTS) (e.g., used with MPEG-2), and a Composite Timestamp (CTS) (e.g., used with MPEG-4). The PES packet header 254 may also include reference clock information and/or timestamp information corresponding with an elementary stream clock reference (ESCR) from which decoders of PES streams may derive reference timing. In some cases, a reference clock may be periodically transmitted in the transport stream. In one example, a Program Clock Reference (PCR) may be periodically transmitted in the adaption field of a transport stream packet (e.g., every 100 ms). In some cases, audio and video elementary streams may be synchronized by combining the PCR with the PTS (which may specify a time relative to the PCR) that resides in the PES packet header.

As depicted in FIG. 2B, a separate messaging channel 244 may be used to transmit and receive messages between a streaming device and one or more client devices. For example, the messaging channel 244 may be used by a streaming device to set maximum and minimum times for receiving encrypted audiovisual content and a client device may communicate an encryption ready signal to the streaming device to indicate that the client device is configured and available to decrypt encrypted audiovisual content.

Figure 3A:
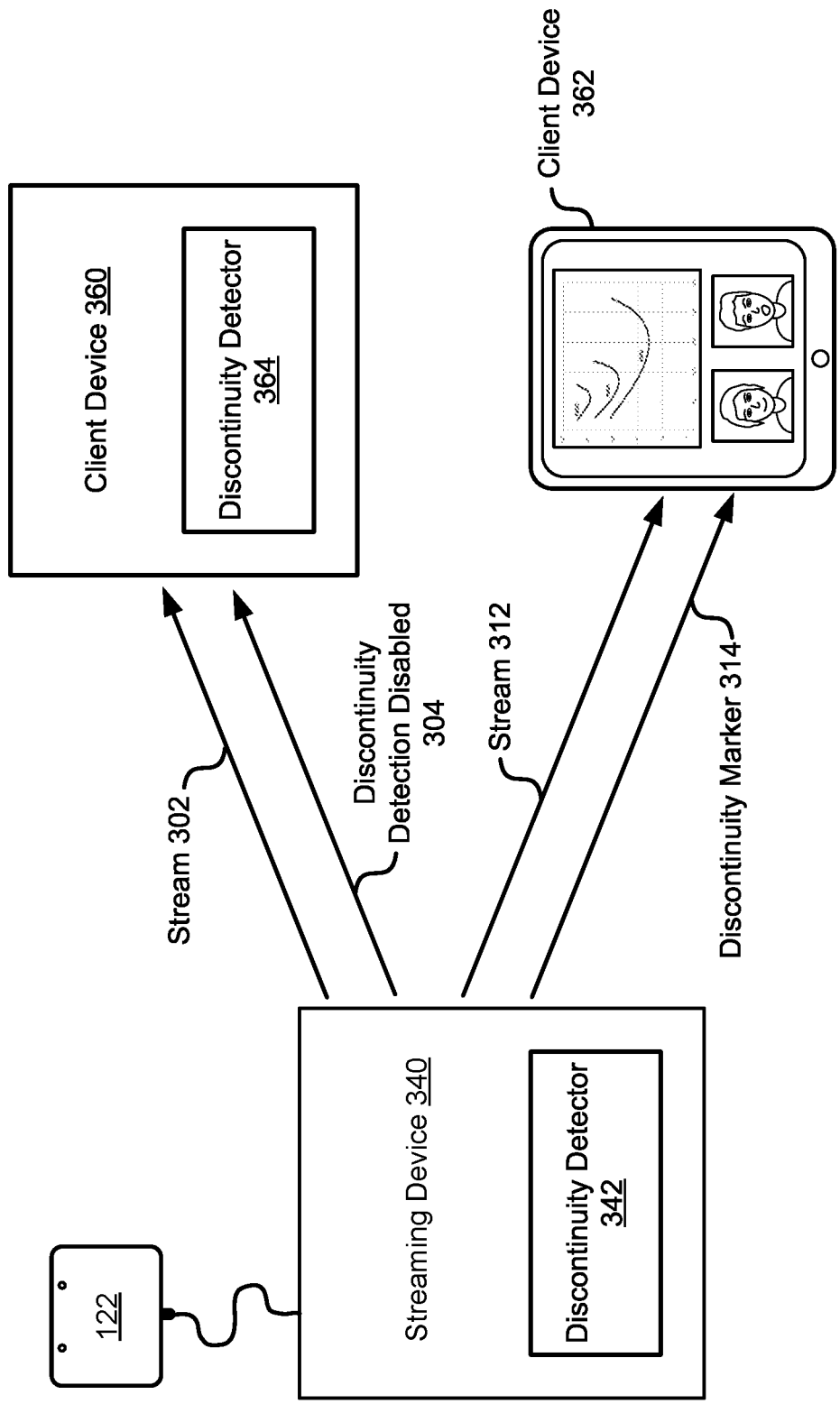
FIG. 3A depicts one embodiment of a streaming device concurrently streaming audiovisual content to a plurality of client devices.

FIG. 3A depicts one embodiment of a streaming device 340 concurrently streaming audiovisual content to a plurality of client devices including client device 360 and client device 362. The streaming device may concurrently stream different digital television channels or different programs to two or more client devices. In one example, the streaming device 340 may correspond with the streaming device 140 in FIG. 1 and the client device 360 may correspond with the client device 160 in FIG. 1. Upon detecting a request from a client device for a particular video stream or upon detecting that a new session for streaming the particular video stream to the client device should be established, the streaming device 340 may determine whether to set a fixed time delay before streaming the requested encrypted video stream or to provide a timing window corresponding with a minimum point in time and a maximum point in time during which the client device may signal via an encryption ready signal to the streaming device that the client device is ready to accept the encrypted video stream. If the client device does not provide the encryption ready signal by the maximum point in time, then the streaming device 340 may transmit the encrypted video stream starting at the maximum point in time.

The streaming device 340 may simultaneously capture or receive one or more digital television channels using an OTA HDTV antenna, such as antenna 122. In one embodiment, the client device 360 may request a live stream of a first digital television channel from the streaming device 340 and in response the streaming device 340 may generate a reduced resolution version of the live stream of the first digital television channel and transmit the reduced resolution video stream 302 to the client device 360. While the reduced resolution video stream 302 is streamed to the client device 360, the streaming device 340 may perform an encryption handshake with the client device 360 to determine encryption and decryption keys or may transmit decryption information and a corresponding start time for receiving an encrypted video stream within a metadata stream, such as metadata stream 270 in FIG. 2B, or via a messaging channel, such as messaging channel 244 in FIG. 2B. In some cases, the stream 302 may correspond with the video stream 250 in FIG. 2B or the transport stream 282 in FIG. 2B.

The streaming device 340 includes a discontinuity detector 342 for detecting timestamp discontinuities and/or video resolution discontinuities occurring within video packets transmitted from the streaming device 340. The client device 360 includes a discontinuity detector 364 for detecting timestamp discontinuities occurring within video packets received from the streaming device 340. In some cases, the streaming device 340 may communicate to the client device 360 that the streaming device 340 is not able to perform timestamp discontinuity detection via a discontinuity detection disabled signal 304. Upon detection that the streaming device 340 is not able to perform timestamp discontinuity detection, the client device 360 may enable the discontinuity detector 364 to acquire incoming transport packets or incoming video packets from the streaming device 340 and detect timestamp discontinuities occurring within the incoming packets.

The streaming device 340 may transmit a stream 312 to client device 362. The stream 312 may comprise a video stream, such as the video stream 250 in FIG. 2B, or a transport stream that includes video and audio packets, such as the transport stream 282 in FIG. 2B. The stream 312 may comprise a video stream that is displayed using a display of the client device 362. In some cases, the discontinuity detector 342 may acquire packets from a video stream before the video stream is time-division multiplexed by a transport stream multiplexer, such as the transport stream multiplexer (TS MUX) 280 in FIG. 2B. In other cases, the discontinuity detector 342 may acquire packets from a transport stream, such as the transport stream 282 in FIG. 2B.

In some embodiments, the streaming device 340 and the client device 360 may perform a handshaking operation in order to determine whether discontinuity detection should be performed by the streaming device 340 or the client device 360. In one example, if the streaming device 340 is streaming less than a threshold number of video streams, then the discontinuity detector 342 of the streaming device 340 may be enabled and the discontinuity detector 364 of the client device 360 may be disabled. In another example, if the CPU usage or total processor utilization of the streaming device 340 is greater than a threshold, then the discontinuity detector 342 of the streaming device 340 may be disabled and the discontinuity detector 364 of the client device 360 may be enabled.

In one embodiment, upon detection of a timestamp discontinuity within the stream 312, which may comprise a transport stream or a packet stream transmitted from the streaming device 340 to the client device 360, the streaming device 340 may communicate a location of the timestamp discontinuity via a discontinuity marker 314. The discontinuity marker 314 may identify the location of the timestamp discontinuity using a location timestamp or a packet identifier corresponding with the last packet transmitted to the client device 360 before the timestamp discontinuity occurs. In some cases, the streaming device 340 may communicate a location of the timestamp discontinuity by transmitting a first packet identifier and a second packet identifier corresponding with two consecutive packets that straddle the timestamp discontinuity.

FIG. 3B depicts one embodiment of a packet chunk 350 that comprises a sequence of packets. The sequence of packets may include video packets, such as video packet 352, and audio packets, such as audio packet 354. The number of audio packets may be less than the number of video packets within the sequence of packets. The video packet 352 may comprise a video PES header 356 and a video PES packet payload 357. The audio packet 354 may comprise an audio PES header 358 and an audio PES packet payload 359. The video packet 352 may be partitioned into a first set of transport stream packets including transport stream packet 351 and the audio packet 354 may be partitioned into a second set of transport stream packets including transport stream packet 353. Each transport stream packet may comprise a fixed length of 188 bytes. The first set of transport stream packets and the second set of transport stream packets may be transmitted within the transport stream 330. The video PES header 356 may include timestamp information (e.g., a timestamp) for the video PES packet payload 357, which may correspond with a particular video frame. The audio PES header 358 may include timestamp information for the audio PES packet payload 359.

FIG. 3C depicts one embodiment of a packet chunk 370 and a process of identifying a location of a timestamp discontinuity within the packet chunk 370. The packet chunk 370 includes a sequence of packets. In one example, the packet chunk 370 may correspond with the packet chunk 350 in FIG. 3B. The packet chunk 370 may include video packets and audio packets. In one embodiment, packets 371-373 may comprise video packets within the packet chunk 370. In another embodiment, packets 371-373 may comprise audio packets within the packet chunk 370. A first time difference 374 may comprise a time difference between a first timestamp associated with packet 371 and a second timestamp associated with packet 372. A second time difference 375 may comprise a time difference between the second timestamp associated with packet 372 and a third timestamp associated with packet 373.

In some embodiments, the time difference between the first timestamp associated with the packet 371 and the third timestamp associated with the packet 373 may correspond with a maximum chunk time difference. As the first timestamp associated with the packet 371 may correspond with the earliest transmitted packet within the sequence of packets and the third timestamp associated with the packet 373 may correspond with the latest transmitted packet within the sequence of packets, the time difference between the first timestamp and the third timestamp may be computed and compared with the maximum chunk time difference for the entire packet chunk 370 to detect the presence of a timestamp discontinuity. In one embodiment, the maximum chunk time difference may be calculated by dividing a chunk size of the packet chunk 370 by a bit rate (or data rate) at which each audio or video packet of the packet chunk was encoded. If the timestamp time difference is greater than the maximum chunk time difference, then a timestamp discontinuity exists within the packet chunk 370. As an example, if the chunk size of the packet chunk 370 comprises 96 KB and the bit rate at which each video packet was encoded comprises 64 KB per second, then the maximum chunk time difference is 96 KB/64 KBps or 1.5 seconds. If the time difference between timestamps corresponding with the earliest transmitted video packet and the latest transmitted video packet within the sequence of packets is greater than 1.5 seconds, then a timestamp discontinuity exists within the packet chunk 370.

In some embodiments, after the timestamp discontinuity has been detected, then a binary search may be performed in order to identify the location of the timestamp discontinuity. A binary search method for identifying the location of the timestamp discontinuity may involve dividing a subset of the sequence of packets into two portions, determining timestamp time differences for the two portions, and then identifying which of the two portions includes the timestamp discontinuity (e.g., the portion with the greatest timestamp time difference may comprise the portion with the timestamp discontinuity). The binary search may be performed recursively (or iteratively) until the location of the timestamp discontinuity is identified.

In one example, the timestamp for a packet in the middle of the sequence of packets, such as packet 372, may be sampled and the first time difference 374 may be compared with the second time difference 375 to determine whether the time discontinuity exists within packets between the first timestamp associated with packet 371 and the second timestamp associated with packet 372 or within packets between the second timestamp associated with packet 372 and the third timestamp associated with packet 373. Thereafter, a recursive process may be performed to identify the location of the timestamp discontinuity. In another embodiment, the timestamps of every video packet within the sequence of packets may be sampled to determine the location of the timestamp discontinuity. In another embodiment, the timestamps of every audio packet within the sequence of packets may be sampled to determine the location of the timestamp discontinuity.

As depicted in FIG. 3C, the packet 322 may comprise the earliest transmitted packet within the packet chunk 370 or the earliest arriving packet within the packet chunk 370. The packet 324 may comprise the latest transmitted packet within the packet chunk 370 or the latest arriving packet within the packet chunk 370. In one embodiment, a streaming electronic device, such as streaming device 226 in FIG. 2A, may transmit a sequence of packets in which packet 322 comprising the earliest transmitted packet is transmitted before transmitting packet 324 comprising the latest transmitted packet. In another embodiment, a client device, such as client device 360 in FIG. 3A, may receive a sequence of packets in which packet 322 comprising the earliest arriving packet is received before receiving packet 324 comprising the latest arriving packet.

FIG. 3D depicts one embodiment of two consecutive packet chunks comprising packet chunk 370 and packet chunk 380. As depicted, a timestamp time difference for the packet chunk 370 may comprise a time difference between a first timestamp associated with the earliest transmitted video packet 376 and the latest transmitted video packet 377. The timestamp time difference for the packet chunk 380 may comprise a time difference between a first timestamp associated with the earliest transmitted video packet 386 and the latest transmitted video packet 387.

FIG. 3E depicts one embodiment of two consecutive packet chunks comprising packet chunk 370 and packet chunk 380. As depicted, a timestamp time difference for the packet chunk 370 may comprise a time difference between a first timestamp associated with the earliest transmitted audio packet 378 and the latest transmitted audio packet 379. The timestamp time difference for the packet chunk 380 may comprise a time difference between a first timestamp associated with the earliest transmitted audio packet 388 and the latest transmitted audio packet 389.

In some embodiments, the process of identifying the earliest transmitted audio packet within a packet chunk that includes timestamp information may include acquiring the earliest transmitted packet within the packet chunk and determining whether the earliest transmitted packet comprises an audio packet that includes timestamp information. Thereafter, the headers of consecutive packets within the sequence of packets are read from the earliest transmitted packet to the latest transmitted packet to identify the earliest transmitted audio packet within the sequence of packets that includes timestamp information. The process of identifying the latest transmitted audio packet within the packet chunk that includes timestamp information may include acquiring the latest transmitted packet within the packet chunk and determining whether the latest transmitted packet comprises an audio packet that includes timestamp information. Thereafter, the headers of consecutive packets within the sequence of packets are read from the latest transmitted packet to the earliest transmitted packet.

Figure 3F:
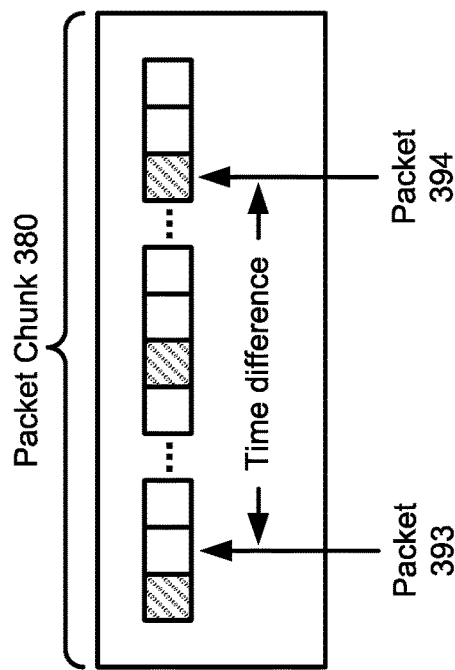
Figure 3F:
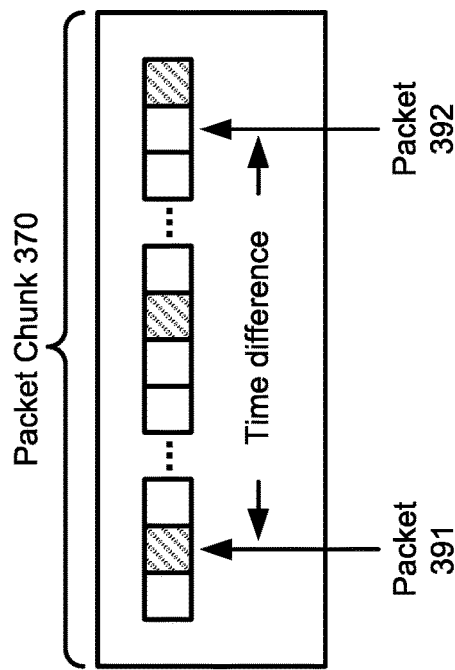

FIG. 3F depicts one embodiment of two consecutive packet chunks comprising packet chunk 370 and packet chunk 380. As depicted, a timestamp time difference for the packet chunk 370 may comprise a time difference between a first timestamp associated with the earliest transmitted audio packet 391 and the latest transmitted video packet 392. The timestamp time difference for the packet chunk 380 may comprise a time difference between a first timestamp associated with the earliest transmitted video packet 393 and the latest transmitted audio packet 394. Thus, in some cases, timestamp information may have be obtained from both audio packets and video packets within the same packet chunk.

Figure 3G:
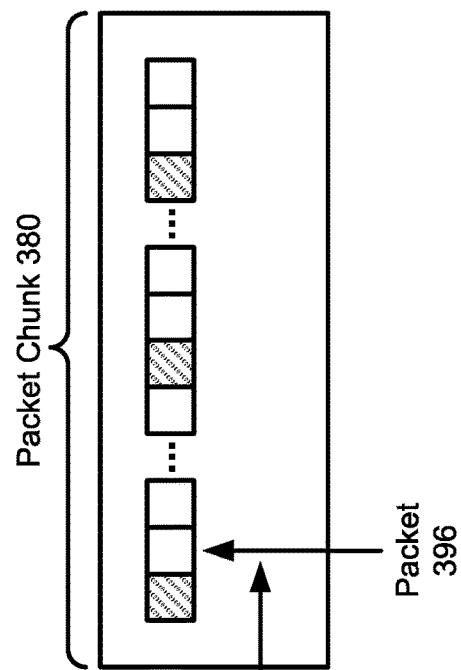
Figure 3G:
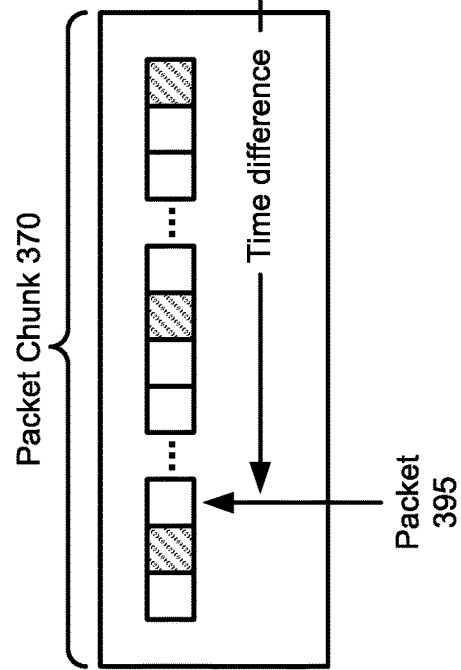

FIG. 3G depicts one embodiment of two consecutive packet chunks comprising packet chunk 370 and packet chunk 380. As depicted, a timestamp time difference for the packet chunk 370 may comprise a time difference between a first timestamp associated with the earliest transmitted video packet 395 within the packet chunk 370 and a second timestamp associated with the earliest transmitted video packet 396 within the packet chunk 380. In this case, rather than determining the timestamp time difference for the packet chunk 370 using timestamp information from two video packets within the packet chunk 370, only a single timestamp from the earliest transmitted video packet 395 within the packet chunk 370 is identified and used to compute the timestamp time difference for the packet chunk 370. In some embodiments, a timestamp time difference for the packet chunk 380 may comprise a time difference between a first timestamp associated with the latest transmitted video packet within the packet chunk 370 and a second timestamp associated with the latest transmitted video packet within the packet chunk 380.

Figure 4A:
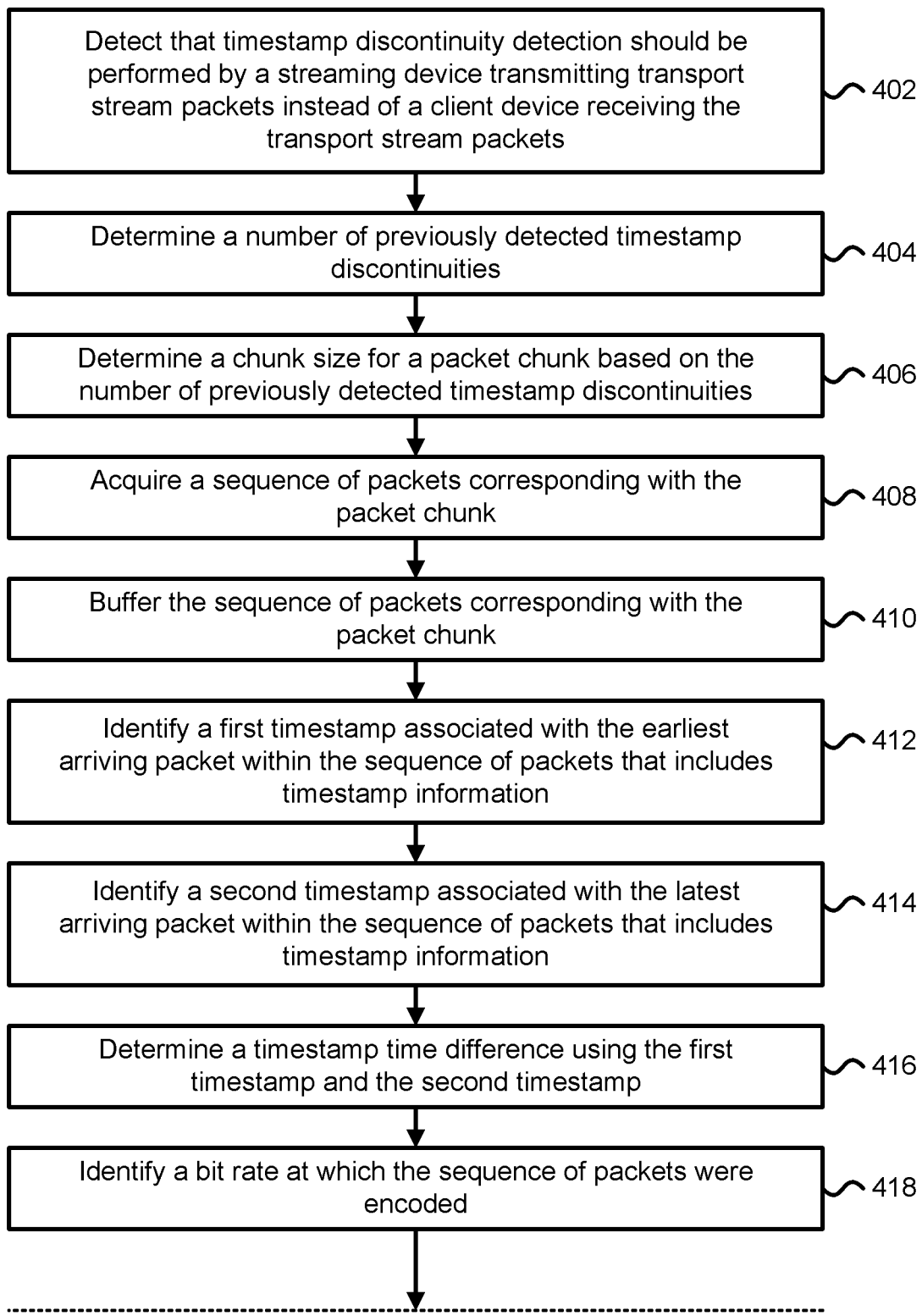
FIGS. 4A-4B depict a flowchart describing one embodiment of a process for detecting timestamp discontinuities within packet chunks.
Figure 4B:
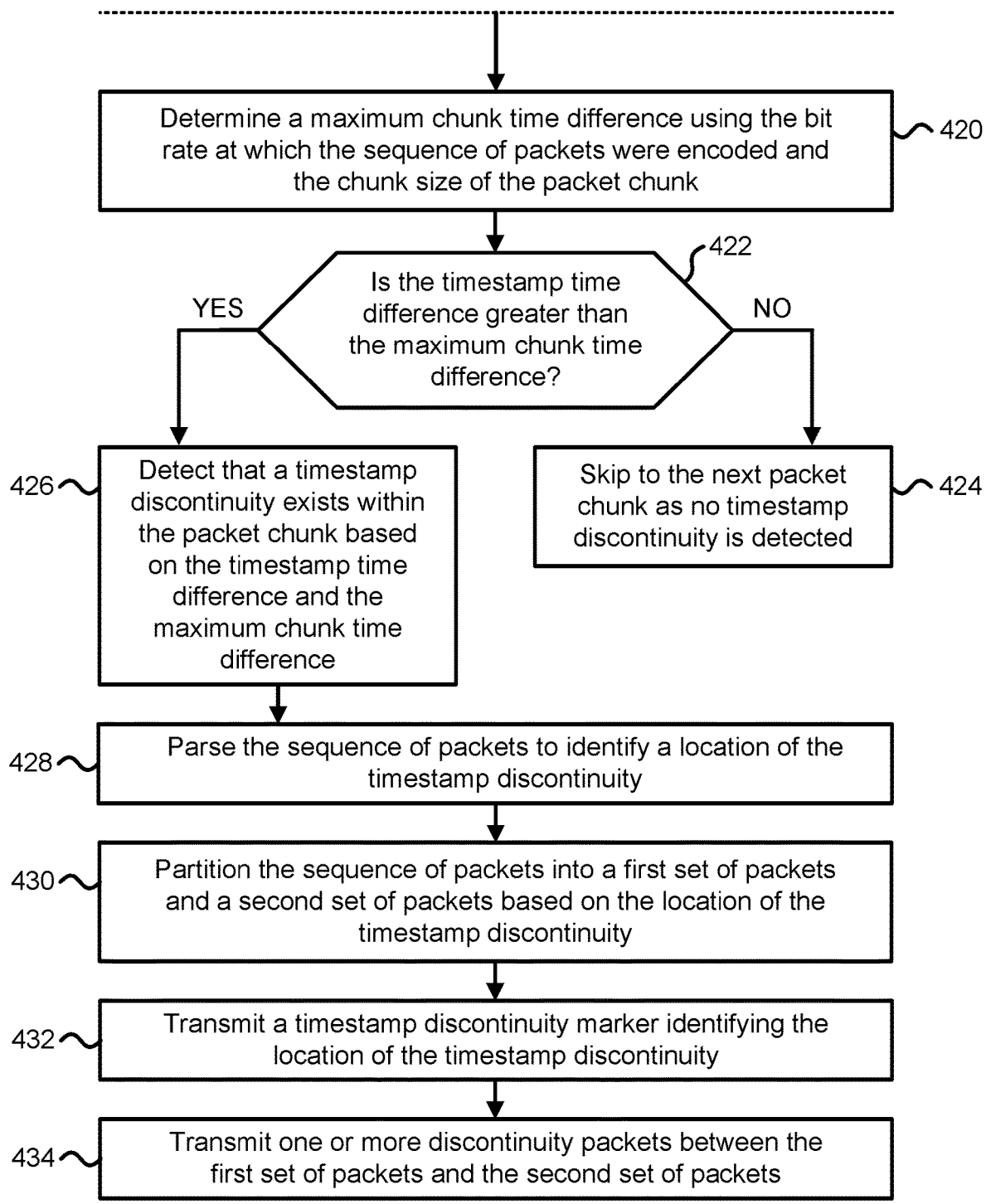

FIGS. 4A-4B depict a flowchart describing one embodiment of a process for detecting timestamp discontinuities within packet chunks. In one embodiment, the process of FIGS. 4A-4B may be performed by a streaming electronic device, such as the streaming device 140 in FIG. 1 or the streaming device 340 in FIG. 3A. In one embodiment, the process of FIGS. 4A-4B may be performed by a client device, such as the client device 160 in FIG. 1 or the client device 360 in FIG. 3A. In some embodiments, the process or portions of the process of FIGS. 4A-4B may be performed using one or more virtual machines and one or more virtual storage devices.

In step 402, it is detected that timestamp discontinuity detection should be performed by a streaming device transmitting transport stream packets instead of a client device receiving the transport stream packets. In step 404, a number of previously detected timestamp discontinuities is determined. A counter stored in a memory, such as memory 147 in FIG. 1, may increment each time a timestamp discontinuity is detected. In step 406, a chunk size for a packet chunk is determined based on the number of previously detected timestamp discontinuities. If the number of previously detected timestamp discontinuities exceeds a threshold number (e.g., exceeds 100), then the chunk size for the packet chunk may be decreased (e.g., cut in half). In step 408, a sequence of packets corresponding with the packet chunk is acquired.

In step 410, the sequence of packets corresponding with the packet chunk is buffered. The sequence of packets may be buffered using a memory, such as memory 147 in FIG. 1. In step 412, a first timestamp associated with the earliest arriving packet within the sequence of packets that includes timestamp information is identified. In some cases, the earliest arriving packet within the sequence of packets may comprise the earliest transmitted packet within the sequence of packets that was transmitted from the streaming device. In other cases, the earliest arriving packet within the sequence of packets may comprise the earliest arriving packet within the sequence of packets that was received by the client device. In step 414, a second timestamp associated with the latest arriving packet within the sequence of packets that includes timestamp information is identified. In some cases, the latest arriving packet within the sequence of packets may comprise the latest transmitted packet within the sequence of packets that was transmitted from the streaming device.

In step 416, a timestamp time difference is determined using the first timestamp and the second timestamp. The timestamp time difference may comprise a first time corresponding with the first timestamp minus a second time corresponding with the second timestamp. In step 418, a bit rate at which the sequence of packets were encoded is identified. In step 420, a maximum chunk time difference is determined using the bit rate at which the sequence of packets were encoded and the chunk size of the packet chunk. The maximum chunk time difference may be estimated as or comprise the chunk size divided by the bit rate.

In step 422, it is determined whether the timestamp time difference is greater than the maximum chunk time difference. If the timestamp time difference is not greater than the maximum chunk time difference, then it may be deemed that no timestamp discontinuity exists within the packet chunk, and in response step 424 is performed in which the process of detecting timestamp discontinuities skips to the next packet chunk. Otherwise, if the timestamp time difference is greater than the maximum chunk time difference, then it may be deemed that a timestamp discontinuity exists within the packet chunk, and in response step 426 is performed. In step 426, it is detected that a timestamp discontinuity exists within the packet chunk based on the timestamp time difference and the maximum chunk time difference.

In step 428, the sequence of packets is parsed to identify a location of the timestamp discontinuity. In step 430, the sequence of packets is partitioned into a first set of packets and a second set of packets based on the location of the timestamp discontinuity. In step 432, a timestamp discontinuity marker identifying the location of the timestamp discontinuity is transmitted. In one example, the timestamp discontinuity marker may be transmitted from a streaming device to a client device. In step 434, one or more discontinuity packets are transmitted or inserted between the first set of packets and the second set of packets.

Figure 4C:
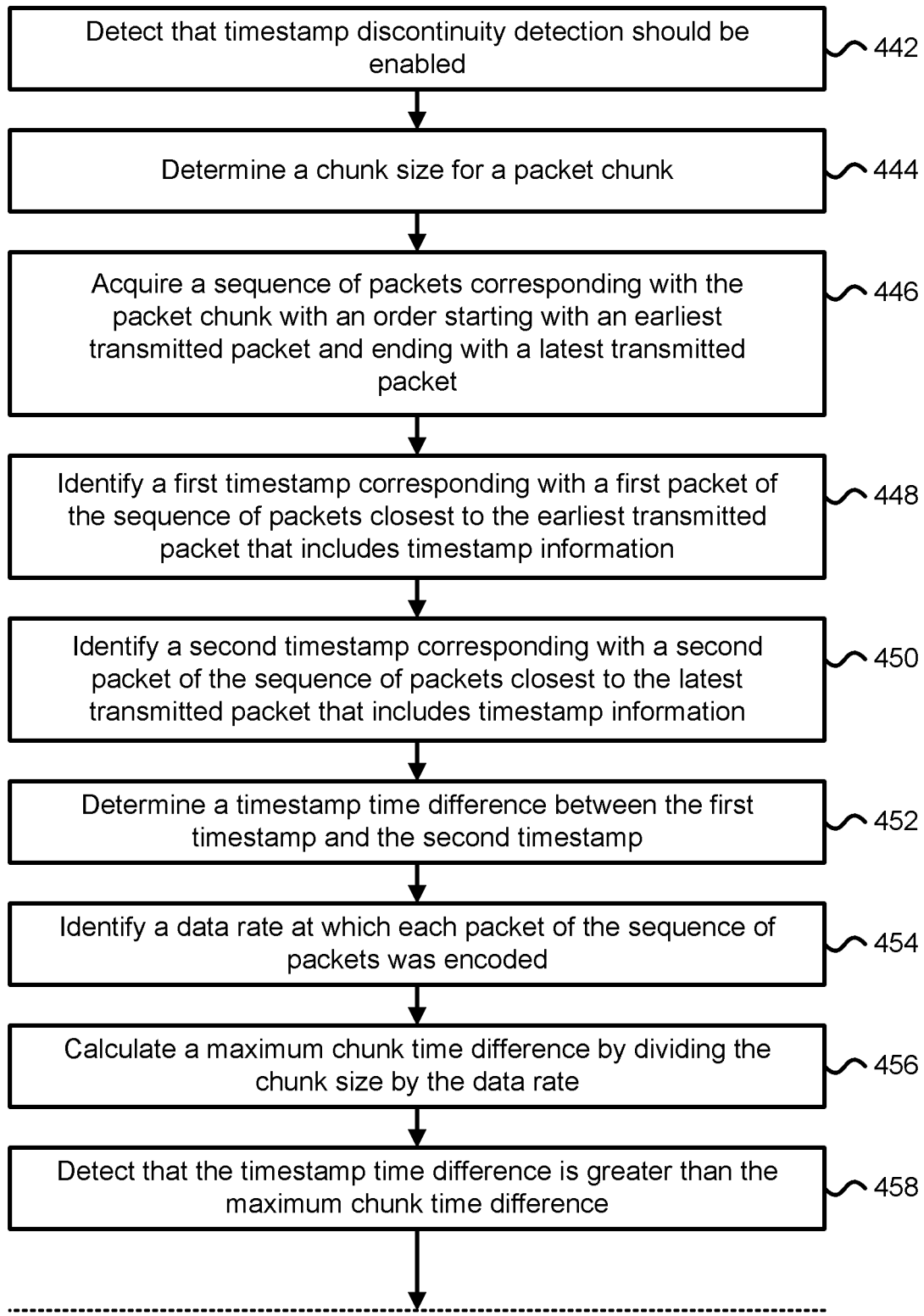
FIGS. 4C-4D depict a flowchart describing an alternative embodiment of a process for detecting timestamp discontinuities within packet chunks.
Figure 4D:
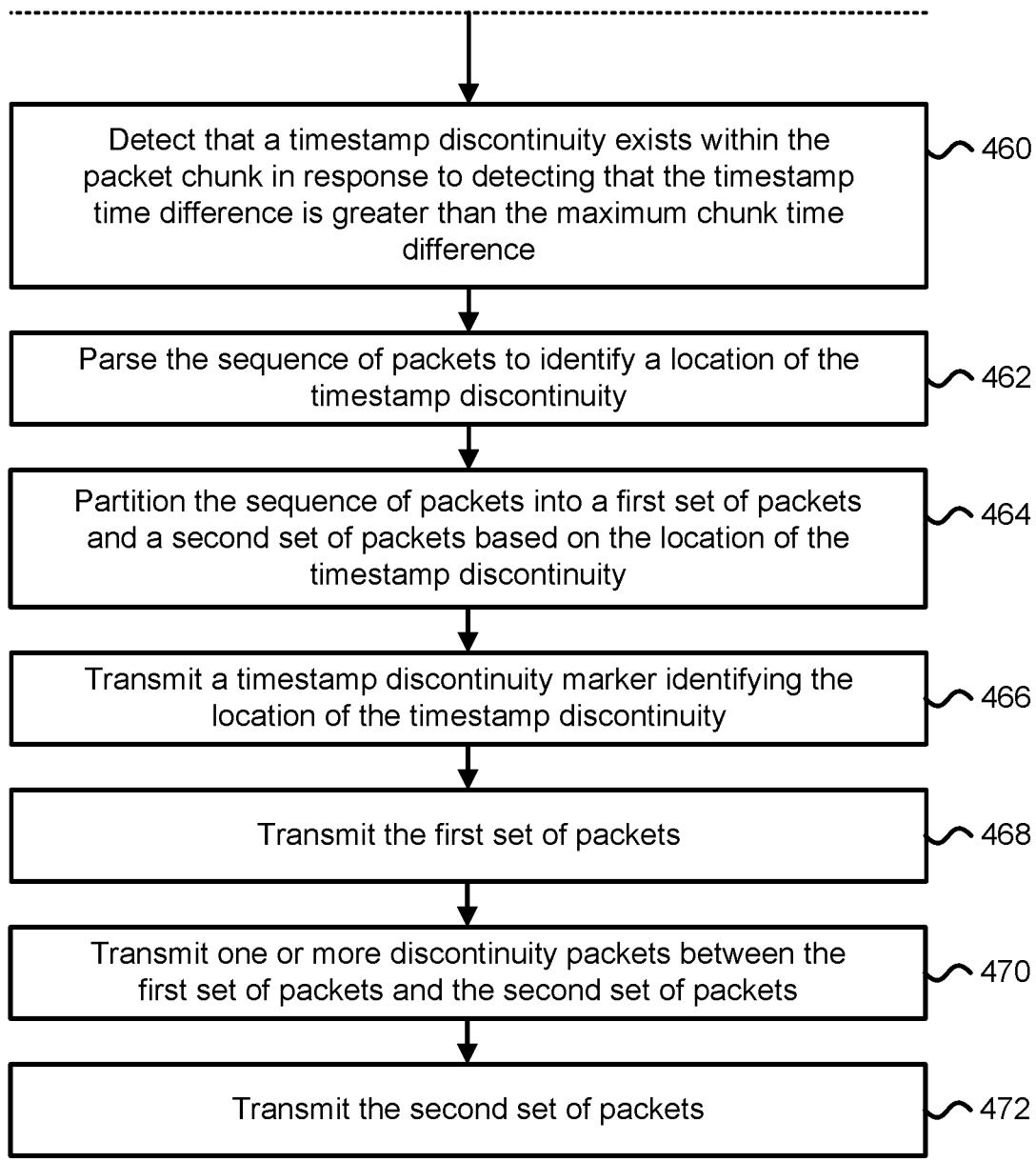

FIGS. 4C-4D depict a flowchart describing an alternative embodiment of a process for detecting timestamp discontinuities within packet chunks. In one embodiment, the process of FIGS. 4C-4D may be performed by a streaming electronic device, such as the streaming device 140 in FIG. 1 or the streaming device 340 in FIG. 3A. In one embodiment, the process of FIGS. 4C-4D may be performed by a client device, such as the client device 160 in FIG. 1 or the client device 360 in FIG. 3A. In some embodiments, the process or portions of the process of FIGS. 4C-4D may be performed using one or more virtual machines and one or more virtual storage devices.

In step 442, it is detected that timestamp discontinuity detection should be enabled. In one embodiment, timestamp discontinuity detection is enabled by enabling a discontinuity detector, such as the discontinuity detector 342 in FIG. 3A, in response to detecting that at least a threshold number of decoder errors have occurred. In step 444, a chunk size for a packet chunk is determined. The chunk size may comprise the total data size for the packet chunk. In step 446, a sequence of packets corresponding with the packet chunk with an order starting with an earliest transmitted packet and ending with a latest transmitted packet is acquired.

In some cases, a sequence of packets corresponding with the packet chunk with an order starting with an earliest arriving packet and ending with a latest arriving packet may be acquired. In one embodiment, the earliest arriving packet may comprise the earliest arriving packet at a client device, such as the client device 360 in FIG. 3A, and the latest arriving packet may comprise the latest arriving packet at the client device.

In step 448, a first timestamp corresponding with a first packet of the sequence of packets closest to the earliest transmitted packet that includes timestamp information is identified. In step 450, a second timestamp corresponding with a second packet of the sequence of packets closest to the latest transmitted packet that includes timestamp information is identified. In some cases, not every packet of the sequence of packets includes timestamp information.

In step 452, a timestamp time difference between the first timestamp and the second timestamp is determined. In step 454, a data rate at which each packet of the sequence of packets was encoded is identified. In step 456, a maximum chunk time difference is calculated by dividing the chunk size by the data rate. In step 458, it is detected that the timestamp time difference is greater than the maximum chunk time difference. In step 460, it is detected that a timestamp discontinuity exists within the packet chunk in response to detecting that the timestamp time difference is greater than the maximum chunk time difference.

In step 462, the sequence of packets is parsed to identify a location of the timestamp discontinuity. In step 464, the sequence of packets is partitioned into a first set of packets and a second set of packets based on the location of the timestamp discontinuity. In step 466, a timestamp discontinuity marker identifying the location of the timestamp discontinuity is transmitted. In step 468, the first set of packets is transmitted. In step 470, one or more discontinuity packets are transmitted or inserted between the first set of packets and the second set of packets. In step 472, the second set of packets is transmitted.

Figure 4E:
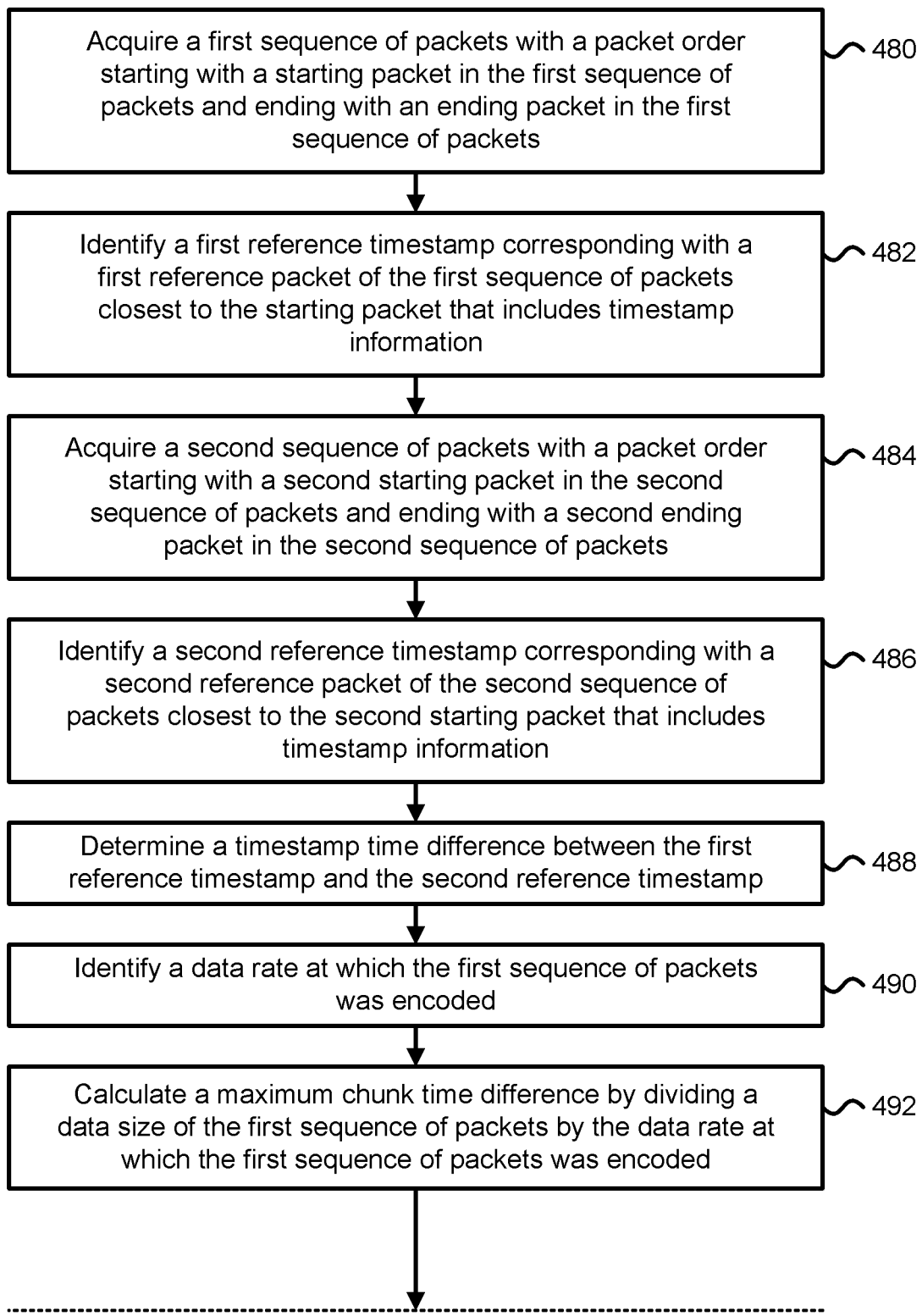
FIGS. 4E-4F depict a flowchart describing a second alternative embodiment of a process for detecting timestamp discontinuities within packet chunks.
Figure 4F:
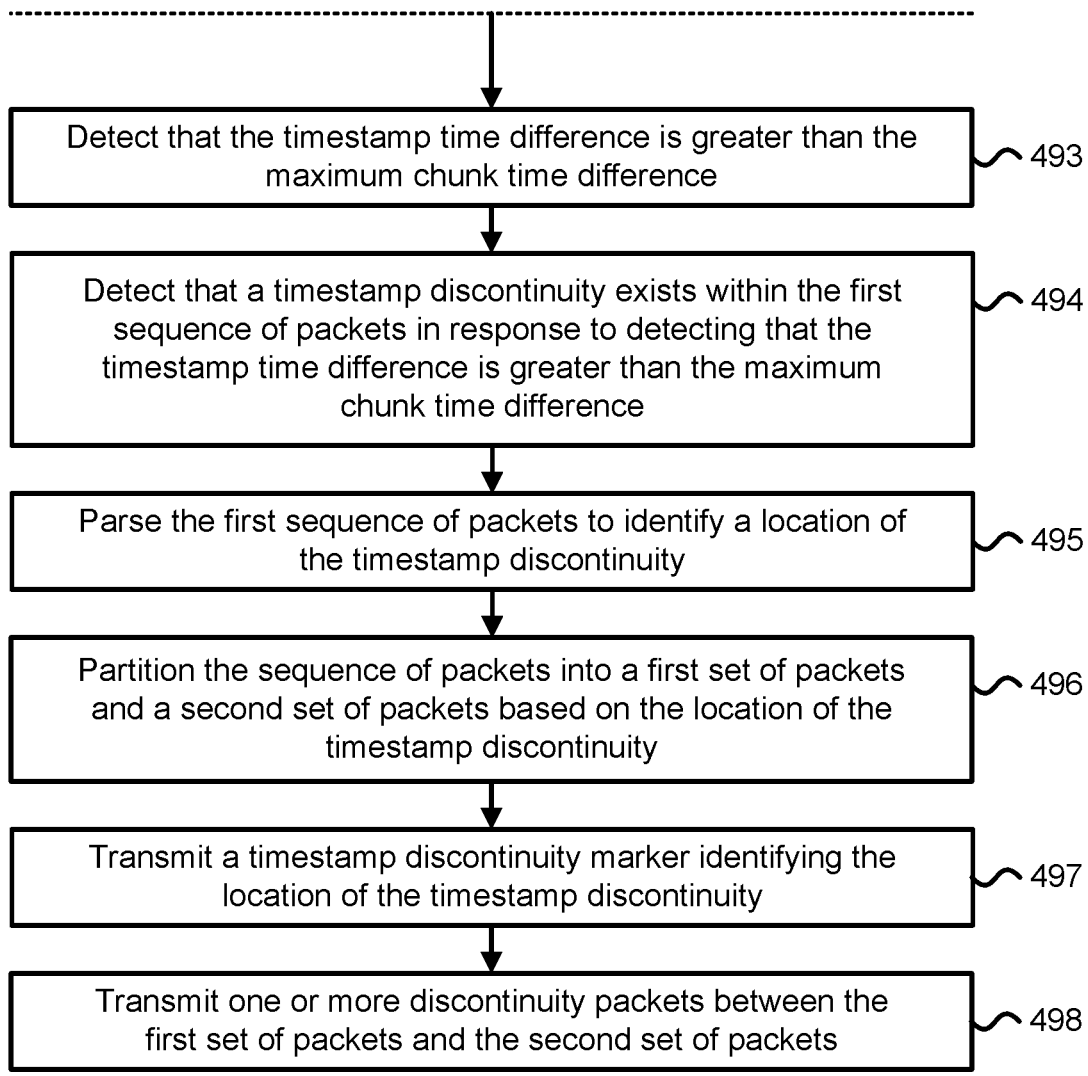

FIGS. 4E-4F depict a flowchart describing a second alternative embodiment of a process for detecting timestamp discontinuities within packet chunks. In one embodiment, the process of FIGS. 4E-4F may be performed by a streaming electronic device, such as the streaming device 140 in FIG. 1 or the streaming device 340 in FIG. 3A. In one embodiment, the process of FIGS. 4E-4F may be performed by a client device, such as the client device 160 in FIG. 1 or the client device 360 in FIG. 3A. In some embodiments, the process or portions of the process of FIGS. 4E-4F may be performed using one or more virtual machines and one or more virtual storage devices.

In step 480, a first sequence of packets with a packet order starting with a starting packet in the first sequence of packets and ending with an ending packet in the first sequence of packets is acquired. The first sequence of packets may be buffered using a memory buffer, such as memory 147 in FIG. 1. In step 482, a first reference timestamp corresponding with a first reference packet of the first sequence of packets closest to the starting packet that includes timestamp information is identified. In step 484, a second sequence of packets with a packet order starting with a second starting packet in the second sequence of packets and ending with a second ending packet in the second sequence of packets is acquired. The second sequence of packets may be buffered using a memory buffer, such as memory 147 FIG. 1.

In step 486, a second reference timestamp corresponding with a second reference packet of the second sequence of packets closest to the second starting packet that includes timestamp information is identified. In step 488, a timestamp time difference between the first reference timestamp and the second reference timestamp is determined. In step 490, a data rate at which the first sequence of packets was encoded is identified. In step 492, a maximum chunk time difference is calculated by dividing a data size of the first sequence of packets by the data rate at which the first sequence of packets was encoded.

In step 493, it is detected that the timestamp time difference is greater than the maximum chunk time difference. In step 494, it is detected that a timestamp discontinuity exists within the first sequence of packets in response to detecting that the timestamp time difference is greater than the maximum chunk time difference. In step 495, the first sequence of packets is parsed to identify a location of the timestamp discontinuity. In step 496, the sequence of packets is partitioned into a first set of packets and a second set of packets based on the location of the timestamp discontinuity. In step 497, a timestamp discontinuity marker identifying the location of the timestamp discontinuity is transmitted. In step 498, one or more discontinuity packets are transmitted or inserted between the first set of packets and the second set of packets.

One embodiment of the disclosed technology includes acquiring a sequence of packets corresponding with a packet chunk, identifying a first timestamp associated with an earliest packet within the sequence of packets using a streaming device, identifying a second timestamp associated with a latest packet within the sequence of packets using a streaming device, determining a timestamp time difference between the first timestamp and the second timestamp, identifying a data rate at which the sequence of packets were encoded, determining a maximum chunk time difference based on the data rate at which the sequence of packets were encoded and a chunk size of the packet chunk, detecting that a timestamp discontinuity exists within the packet chunk based on the timestamp time difference and the maximum chunk time difference, identifying a location of the timestamp discontinuity within the packet chunk, and transmitting a timestamp discontinuity marker identifying the location of the timestamp discontinuity from the streaming device. In some cases, identifying the first timestamp includes identifying an earliest transmitted packet within the sequence of packets that includes timestamp information.

One embodiment of the disclosed technology comprises an electronic device including a storage device (e.g., a semiconductor memory) and one or more processors in communication with the storage device. The storage device configured to store a sequence of packets corresponding with a packet chunk. The one or more processors configured to identify a first timestamp associated with an earliest packet within the sequence of packets and identify a second timestamp associated with a latest packet within the sequence of packets. The one or more processors configured to determine a timestamp time difference between the first timestamp and the second timestamp and determine a data rate at which the sequence of packets were encoded. The one or more processors configured to determine a maximum chunk time difference based on the data rate and a chunk size of the packet chunk. The one or more processors configured to detect that a timestamp discontinuity exists within the packet chunk based on the timestamp time difference and the maximum chunk time difference and identify a location of the timestamp discontinuity within the packet chunk. The one or more processors configured to transmit the location of the timestamp discontinuity.

One embodiment of the disclosed technology includes acquiring a first sequence of packets with a packet order starting with a starting packet of the first sequence of packets and ending with an ending packet of the first sequence of packets, identifying a first reference timestamp corresponding with a first reference packet of the first sequence of packets closest to the starting packet, acquiring a second sequence of packets with a packet order starting with a second starting packet of the second sequence of packets and ending with a second ending packet of the second sequence of packets, identifying a second reference timestamp corresponding with a second reference packet of the second sequence of packets closest to the second starting packet, determining a timestamp time difference between the first reference timestamp and the second reference timestamp, identifying a data rate at which the first sequence of packets was encoded, determining a maximum chunk time difference by dividing a data size of the first sequence of packets by the data rate at which the first sequence of packets was encoded, detecting that the timestamp time difference is greater than the maximum chunk time difference, detecting that a timestamp discontinuity exists within the first sequence of packets in response to detecting that the timestamp time difference is greater than the maximum chunk time difference, identifying a location of the timestamp discontinuity within the first sequence of packets, and transmitting the location of the timestamp discontinuity. The disclosed technology may further include partitioning the first sequence of packets into a first set of packets and a second set of packets based on the location of the timestamp discontinuity and transmitting the first set of packets prior to transmitting the location of the timestamp discontinuity.

The disclosed technology may be described in the context of computer-executable instructions being executed by a computer or processor. The computer-executable instructions may correspond with portions of computer program code, routines, programs, objects, software components, data structures, or other types of computer-related structures that may be used to perform processes using a computer. Computer program code used for implementing various operations or aspects of the disclosed technology may be developed using one or more programming languages, including an object oriented programming language such as Java or C++, a function programming language such as Lisp, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

The flowcharts and block diagrams in the figures provide illustrations of the architecture, functionality, and operation of possible implementations of systems, methods, and computer program products according to various aspects of the disclosed technology. In this regard, each block in a flowchart may correspond with a program module or portion of computer program code, which may comprise one or more computer-executable instructions for implementing the specified functionality. In some implementations, the functionality noted within a block may occur out of the order noted in the figures. For example, two blocks shown in succession may, in fact, be executed substantially concurrently, or the blocks may sometimes be executed in the reverse order, depending upon the functionality involved. In some implementations, the functionality noted within a block may be implemented using hardware, software, or a combination of hardware and software.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for detecting timestamp discontinuities, comprising:
   acquiring a packet chunk that includes a sequence of packets;
   identifying, at a streaming device, a first timestamp associated with an earliest packet within the sequence of packets;
   identifying, at the streaming device, a second timestamp associated with a latest packet within the sequence of packets;
   determining a timestamp time difference between the first timestamp and the second timestamp;
   identifying a data rate at which the sequence of packets were encoded;
   determining a maximum chunk time difference based on the data rate at which the sequence of packets were encoded and a chunk size of the packet chunk;
   detecting, at the streaming device, that a timestamp discontinuity exists within the packet chunk based on the timestamp time difference and the maximum chunk time difference;
   identifying a location of the timestamp discontinuity within the packet chunk; and
   transmitting the location of the timestamp discontinuity from the streaming device.

2. The method of claim 1, wherein:
   the identifying the first timestamp includes identifying an earliest transmitted packet within the sequence of packets that includes timestamp information.

3. The method of claim 1, wherein:
   the identifying the second timestamp includes identifying a latest transmitted packet within the sequence of packets that includes timestamp information.

4. The method of claim 1, further comprising:
   determining a number of previously detected timestamp discontinuities; and
   setting the chunk size for the packet chunk based on the number of previously detected timestamp discontinuities.

5. The method of claim 1, further comprising:
   detecting that timestamp discontinuity detection should be performed by the streaming device and acquiring the sequence of packets at the streaming device in response to detecting that the timestamp discontinuity detection should be performed by the streaming device.

6. The method of claim 5, further comprising:
   determining a number of video streams being concurrently streamed from the streaming device and detecting that the timestamp discontinuity detection should be performed by the streaming device based on the number of video streams being streamed from the streaming device.

7. The method of claim 5, further comprising:
   determining a number of video streams being concurrently streamed from the streaming device and detecting that the timestamp discontinuity detection should be performed by the streaming device if the number of video streams being streamed from the streaming device exceeds a threshold number of video streams.

8. The method of claim 1, further comprising:
   parsing the sequence of packets to identify the location of the timestamp discontinuity using a binary search method.

9. The method of claim 1, further comprising:
   partitioning the sequence of packets into a first set of packets and a second set of packets based on the location of the timestamp discontinuity; and
   transmitting one or more discontinuity packets between the first set of packets and the second set of packets.

10. The method of claim 9, wherein:
    the one or more discontinuity packets include a null packet.

11. An electronic device for detecting timestamp discontinuities, comprising:
    a storage device configured to store a packet chunk that includes a sequence of packets; and
    one or more processors in communication with the storage device configured to identify a first timestamp associated with an earliest packet within the sequence of packets and identify a second timestamp associated with a latest packet within the sequence of packets, the one or more processors configured to determine a timestamp time difference between the first timestamp and the second timestamp and determine a data rate at which the sequence of packets were encoded, the one or more processors configured to determine a maximum chunk time difference based on the data rate and a chunk size of the packet chunk, the one or more processors configured to detect that a timestamp discontinuity exists within the packet chunk based on the timestamp time difference and the maximum chunk time difference and identify a location of the timestamp discontinuity within the packet chunk, the one or more processors configured to transmit the location of the timestamp discontinuity.

12. The electronic device of claim 11, wherein:
the one or more processors configured to identify an earliest transmitted packet within the sequence of packets that includes timestamp information and determine the first timestamp from the timestamp information.

13. The electronic device of claim 11, wherein:
the one or more processors configured to identify a first packet of the sequence of packets closest to an earliest transmitted packet that includes timestamp information and determine the first timestamp from the timestamp information.

14. The electronic device of claim 11, wherein:
the one or more processors configured to identify a latest transmitted packet within the sequence of packets that includes timestamp information and determine the second timestamp from the timestamp information.

15. The electronic device of claim 11, wherein:
the one or more processors configured to determine a number of previously detected timestamp discontinuities and adjust the chunk size for the packet chunk based on the number of previously detected timestamp discontinuities.

16. A method for detecting timestamp discontinuities, comprising:
acquiring a first sequence of packets with a packet order starting with a starting packet of the first sequence of packets and ending with an ending packet of the first sequence of packets;
identifying a first reference timestamp corresponding with a first reference packet of the first sequence of packets closest to the starting packet;
acquiring a second sequence of packets with a packet order starting with a second starting packet of the second sequence of packets and ending with a second ending packet of the second sequence of packets;
identifying a second reference timestamp corresponding with a second reference packet of the second sequence of packets closest to the second starting packet;
determining a timestamp time difference between the first reference timestamp and the second reference timestamp;
identifying a data rate at which the first sequence of packets was encoded;
determining a maximum chunk time difference by dividing a data size of the first sequence of packets by the data rate at which the first sequence of packets was encoded;
detecting that the timestamp time difference is greater than the maximum chunk time difference;
detecting that a timestamp discontinuity exists within the first sequence of packets in response to detecting that the timestamp time difference is greater than the maximum chunk time difference;
identifying a location of the timestamp discontinuity within the first sequence of packets; and
transmitting the location of the timestamp discontinuity.

17. The method of claim 16, further comprising:
partitioning the first sequence of packets into a first set of packets and a second set of packets based on the location of the timestamp discontinuity; and
transmitting the first set of packets prior to transmitting the location of the timestamp discontinuity.

18. The method of claim 17, further comprising:
transmitting one or more discontinuity packets between the first set of packets and the second set of packets.

19. The method of claim 16, further comprising:
transmitting the second set of packets subsequent to transmitting the location of the timestamp discontinuity.

20. The method of claim 16, further comprising:
determining a number of previously detected timestamp discontinuities; and
setting the data size for the first sequence of packets based on the number of previously detected timestamp discontinuities.

* * * * *